US011611774B2

(12) United States Patent
Yano et al.

(10) Patent No.: US 11,611,774 B2
(45) Date of Patent: Mar. 21, 2023

(54) IMAGE PROCESSING APPARATUS AND IMAGE PROCESSING METHOD FOR 3D DATA COMPRESSION

(71) Applicant: SONY CORPORATION, Tokyo (JP)

(72) Inventors: Koji Yano, Tokyo (JP); Ohji Nakagami, Tokyo (JP); Tsuyoshi Kato, Kanagawa (JP); Satoru Kuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 110 days.

(21) Appl. No.: 16/960,391

(22) PCT Filed: Jan. 7, 2019

(86) PCT No.: PCT/JP2019/000052
§ 371 (c)(1),
(2) Date: Jul. 7, 2020

(87) PCT Pub. No.: WO2019/142667
PCT Pub. Date: Jul. 25, 2019

(65) Prior Publication Data
US 2020/0359053 A1 Nov. 12, 2020

(30) Foreign Application Priority Data
Jan. 17, 2018 (JP) .............................. JP2018-005421

(51) Int. Cl.
G06T 9/00 (2006.01)
G06T 15/00 (2011.01)
(Continued)

(52) U.S. Cl.
CPC ............ H04N 19/597 (2014.11); G06T 9/00 (2013.01); G06T 9/001 (2013.01); G06T 15/00 (2013.01);
(Continued)

(58) Field of Classification Search
None
See application file for complete search history.

(56) References Cited

U.S. PATENT DOCUMENTS 9,607,394 B2 * 3/2017 Yan ..................... G06T 11/60
11,375,235 B2 * 6/2022 Fleureau .............. H04N 19/597
(Continued)

FOREIGN PATENT DOCUMENTS

EP  1321893 A2  6/2003
JP  2003-296755 A  10/2003
(Continued)

OTHER PUBLICATIONS

Foreign Priority Document for FOR Citation N (Schwarz et al. WO 2019/115867 A1) (Year: 2017).*
Golla, et al., "Real-time Point Cloud Compression", 2015 IEEE/RSJ International Conference on Intelligent Robots and Systems (IROS), Hamburg, Germany, 2015 IEEE, Sep. 28-Oct. 2015, pp. 5087-5092.
Khaled Mammou, "PCC Test Model Category 2 v0", ISO/IEC JTC1/SC29/WG11 N17248, Macau, China, International Organisation for Standardisation Organisation ,Oct. 2017, pp. 11.
(Continued)

Primary Examiner — Tyler W. Sullivan
(74) Attorney, Agent, or Firm — Chip Law Group

(57) ABSTRACT

The present disclosure relates to an image processing apparatus and an image processing method capable of suppressing a reduction in encoding efficiency. A bit stream is generated which contains: information indicating a correspondence relation between at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present at each position; and encoded data regarding the geometry image, encoded data regarding the texture image, and encoded data regarding the occupancy map. The present disclosure is applicable to, for example, an information processing apparatus, an image processing apparatus, an electronic appara-
(Continued)

tus, an information processing method, a program, and the like.

7 Claims, 32 Drawing Sheets

(51) Int. Cl.
    *H04N 19/46*     (2014.01)
    *H04N 19/597*     (2014.01)
    *H04N 19/186*     (2014.01)
    *H04N 19/23*     (2014.01)

(52) U.S. Cl.
    CPC .......... *H04N 19/186* (2014.11); *H04N 19/23* (2014.11); *H04N 19/46* (2014.11)

(56) References Cited

U.S. PATENT DOCUMENTS

| | | | |
|---|---|---|---|
| 2003/0214502 | A1 | 11/2003 | Park et al. |
| 2019/0087978 | A1* | 3/2019 | Tourapis .............. G06T 9/00 |
| 2019/0087979 | A1* | 3/2019 | Mammou .............. H04N 19/597 |
| 2019/0139266 | A1* | 5/2019 | Budagavi .............. G06T 9/001 |
| 2019/0311500 | A1* | 10/2019 | Mammou .............. G06T 9/001 |
| 2020/0105024 | A1* | 4/2020 | Mammou .............. H04N 19/597 |
| 2020/0374559 | A1* | 11/2020 | Fleureau .............. G06T 9/00 |
| 2021/0027505 | A1* | 1/2021 | Yano .............. H04N 19/115 |
| 2021/0176474 | A1* | 6/2021 | Kato .............. H04N 19/105 |
| 2021/0233278 | A1* | 7/2021 | Kuma .............. H04N 19/85 |
| 2021/0250600 | A1* | 8/2021 | Kuma .............. G06T 9/00 |

FOREIGN PATENT DOCUMENTS

| | | |
|---|---|---|
| KR | 10-2003-0043637 A | 6/2003 |
| WO | WO-2019115867 A1 * | 6/2019 |
| WO | WO-2019135024 A1 * | 7/2019 |

OTHER PUBLICATIONS

Mammou, et al., "Video-based and Hierarchical Approaches Point Cloud Compression", ISO/IEC JTC1/SC29/WG11 m41649, Macau, China, International Organization for Standardization, Oct. 2017, pp. 3.

Golla, et al., "Real-time Point Cloud Compression", 2015 IEEE/RSJ International Conference on Intelligent Robots and Systems (IROS), Congress Center Hamburg, Sep. 28-Oct. 2, 2015, pp. 5087-5092.

International Search Report and Written Opinion of PCT Application No. PCT/JP2019/000052, dated Mar. 19, 2019, 07 pages of ISRWO.

Golla, et al., "Real-time Point Cloud Compression", IEEE/RSJ International Conference on Intelligent Robots and Systems (IROS), 2015, 06 pages.

"PCC Test Model Category 2 v0", 3DG, Ed. Khaled Mammou, International Organization for Standardisation, Macau, China, ISO/IEC JTC1/SC29/WG11, N17248, Coding of Moving Pictures and Audio, Oct. 2017, 11 pages.

Mammou, et al., "Video-based and Hierarchical Approaches Point Cloud Compression", Apple Inc., ISO/IEC JTC1/SC29/WG11, Macau, China, m41649, Oct. 2017, 03 pages.

Telecommunication Standardization Sector of ITU (International Telecommunication Union), "Advanced video coding for generic audiovisual services," H.264, Apr. 2017, 812 pages.

Telecommunication Standardization Sector of ITU (International Telecommunication Union), "High efficiency video coding," H.265, Dec. 2016, 664 pages.

Jianle Chen, Elena Alshina, Gary J. Sullivan, Jens-Rainer, Jill Boyce, "Algorithm Description of Joint Exploration Test Model [[4]]7," JVET-G1001_v1, Joint Video Exploration Team (JVET) of ITU-T SG 16 WP 3 and ISO/IEC JTC 1/SC 29/WG 11 7th Meeting: Torino, IT, 13-2 Jul. 1, 2017, 50 pages.

* cited by examiner

F I G . 5

| | OUTLINE | Occupancy map | Geometry | Texture | EFFECT | Bitstream ADDITIONAL INFORMATION |
|---|---|---|---|---|---|---|
| CONVENTIONAL TECHNOLOGY | | RELATION OF 1:1:1 IS NECESSARY IN ENTIRE FRAME | | | | |
| METHOD 1 | CHANGE FRAME-LEVEL RESOLUTION (COMMON RESOLUTION TO GEOMETRY AND TEXTURE) | IMAGE SIZE W*H | w*h (w=α*W, h=β*H; 1>α>0, 1>β>0) | w*h (w=α*W, h=β*H; 1>α>0, 1>β>0) | QUALITIES OF P/B-Pictures ARE ADJUSTABLE | ADD INFORMATION ABOUT α/β TO HEADER OF BIT STREAM |
| METHOD 2 | CHANGE FRAME-LEVEL RESOLUTION (DIFFER IN RESOLUTION BETWEEN GEOMETRY AND TEXTURE) | IMAGE SIZE W*H | w*h (w=α g*W, h=β g*H; 1>α g>0, 1>β g>0) | w*h (w=α t*W, h=β t*H; 1>α t>0, 1>β t>0) | HANDLE DATA DIFFERENT IN RESOLUTION BETWEEN GEOMETRY AND TEXTURE | ADD INFORMATION ABOUT αg/βg/αt/βt TO HEADER OF BIT STREAM |
| METHOD 3 | CHANGE PER-PATCH POSITION AND PER-PATCH RESOLUTION (COMMON RESOLUTION TO GEOMETRY AND TEXTURE) | POSITION INFORMATION ABOUT EACH PATCH u0, v0, u1, v1 | POSITION INFORMATION ABOUT EACH PATCH u0, v0, u1, v1 | POSITION INFORMATION ABOUT EACH PATCH u0, v0, u1, v1 | IMAGE QUALITY IS ADJUSTABLE PER AREA. IMPROVE ENCODING EFFICIENCY OF SUBSEQUENT VIDEO CODEC | ADD INFORMATION ABOUT u0,v0 AND u1,v1 to INFORMATION ABOUT EACH PATCH OF Occupancy |
| METHOD 4 | CHANGE PER-PATCH POSITION AND PER-PATCH RESOLUTION (DIFFER IN RESOLUTION BETWEEN GEOMETRY AND TEXTURE) | POSITION INFORMATION ABOUT EACH PATCH ug0, vg0, ug1, vg1 | POSITION INFORMATION ABOUT EACH PATCH ug0, vg0, ug1, vg1 | POSITION INFORMATION ABOUT EACH PATCH ut0, vt0, ut1, vt1 | IMAGE QUALITY IS ADJUSTABLE PER AREA. IMPROVE ENCODING EFFICIENCY OF SUBSEQUENT VIDEO CODEC. HANDLE DATA DIFFERENT IN RESOLUTION BETWEEN GEOMETRY AND TEXTURE | ADD INFORMATION ABOUT ug0, vg0, ug1,vg1, ut0,vt0, AND ut1,vt1 to INFORMATION ABOUT EACH PATCH OF Occupancy |
| METHOD 5 | UNPACK GEOMETRY AND TEXTURE WITHOUT CHANGING POSITION AND RESOLUTION | POSITION INFORMATION u, v | POSITION INFORMATION ug, vg | POSITION INFORMATION ut, vt | UNNECESSARY TO CHANGE POSITION AND RESOLUTION DURING DECODING | ADD TABLE INFORMATION ABOUT PER-PIXEL CORRESPONDENCE RELATION BETWEEN GEOMETRY AND TEXTURE TO Occupancy |

F I G . 1 2
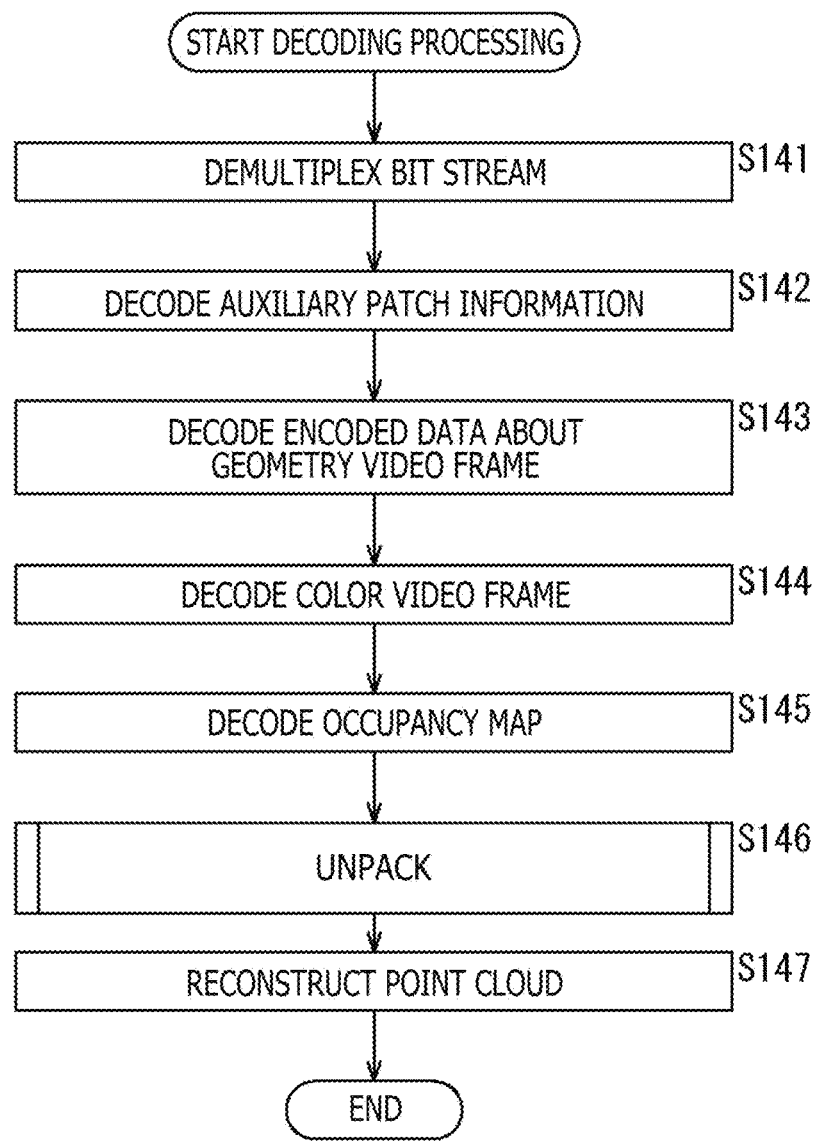

IMAGE PROCESSING APPARATUS AND IMAGE PROCESSING METHOD FOR 3D DATA COMPRESSION

CROSS REFERENCE TO RELATED APPLICATIONS

This application is a U.S. National Phase of International Patent Application No. PCT/JP2019/000052 filed on Jan. 7, 2019, which claims priority benefit of Japanese Patent Application No. JP 2018-005421 filed in the Japan Patent Office on Jan. 17, 2018. Each of the above-referenced applications is hereby incorporated herein by reference in its entirety.

TECHNICAL FIELD

The present disclosure relates to an image processing apparatus and an image processing method, and particularly relates to an image processing apparatus and an image processing method capable of suppressing a reduction in encoding efficiency.

BACKGROUND ART

Conventionally, as a 3D data encoding method for representing a three-dimensional structure such as a point cloud, an approach for projecting positions and color information of the point cloud onto two-dimensional planes per small area and encoding the positions and the color information by an encoding method for two-dimensional images (hereinafter, also referred to as "Video-based approach") has been proposed (refer to, for example, NPL 1 to NPL 3).

CITATION LIST

Non Patent Literature

[NPL 1]
Tim Golla and Reinhard Klein, "Real-time Point Cloud Compression," IEEE, 2015
[NPL 2]
K. Mammou, "Video-based and Hierarchical Approaches Point Cloud Compression," MPEG m41649, October 2017
[NPL 3]
"PCC Test Model Category 2 v0," N17248 MPEG output document, October 2017

SUMMARY

Technical Problem

The conventional method, however, constitute a restriction that position information and attribute information (color information and the like) are identical in spatial resolution and phase (position) at the time of projecting the point cloud onto the two-dimensional planes. Owing to this, objects to be encoded and compression functionality are limited, possibly resulting in a reduction in encoding efficiency.

The present disclosure has been achieved in light of such circumstances and an object of the present disclosure is to enable suppression of a reduction in encoding efficiency.

Solution to Problem

An image processing apparatus according to one aspect of the present technology is an image processing apparatus including a bit stream generation section that generates a bit stream. The bit stream contains: information indicating a correspondence relation between at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present at each position; and encoded data regarding the geometry image, encoded data regarding the texture image, and encoded data regarding the occupancy map.

An image processing method according to one aspect of the present technology is an image processing method including generating a bit stream. The bit stream contains: information indicating a correspondence relation between at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present at each position; and encoded data regarding the geometry image, encoded data regarding the texture image, and encoded data regarding the occupancy map.

An image processing apparatus according to another aspect of the present technology is an image processing apparatus including an unpacking section. The unpacking section unpacks each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

An image processing method according to another aspect of the present technology is an image processing method including unpacking each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

In the image processing apparatus and the image processing method according to one aspect of the present technology, a bit stream containing: information indicating a correspondence relation between at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present at each position; and encoded data regarding the geometry image, encoded data regarding the texture image, and encoded data regarding the occupancy map is generated.

In the image processing apparatus and the image processing method according to another aspect of the present technology, each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position is unpacked on the basis of information indicating a correspondence relation between at least one of the geometry image or the texture image and the occupancy map.

Advantageous Effects of Invention

According to the present disclosure, it is possible to process information. It is particularly possible to suppress a reduction in encoding efficiency.

BRIEF DESCRIPTION OF DRAWINGS

FIG. 5 is a diagram summarizing the present technology described in embodiments.

FIG. 12 is a flowchart illustrating an example of a flow of decoding processing.

DESCRIPTION OF EMBODIMENTS

Modes for carrying out the present disclosure (hereinafter, referred to as "embodiments") will be described hereinafter. It is noted that description will be given in the following order.
1. Video-based approach
2. First embodiment (Common overall resolution)
3. Second embodiment (Individual overall resolutions)
4. Third embodiment (Common patch position and resolution)
5. Fourth embodiment (Individual patch positions and resolutions)
6. Fifth embodiment (Unpacking and 3D reconstruction)
7. Notes 1. Video-Based Approach <Documents and the Like Supporting Technical Contents and Technical Terms>

A scope disclosed in the present technology includes not only contents described in embodiments but also contents described in the following non patent literature that were well known at the time of filing the present application.
Non Patent Literature 1: (described above)
Non Patent Literature 2: (described above)
Non Patent Literature 3: (described above)
Non Patent Literature 4: TELECOMMUNICATION STANDARDIZATION SECTOR OF ITU (International Telecommunication Union), "Advanced video coding for generic audiovisual services," H.264, April 2017
Non Patent Literature 5: TELECOMMUNICATION STANDARDIZATION SECTOR OF ITU (International Telecommunication Union), "High efficiency video coding," H.265, December 2016
Non Patent Literature 6: Jianle Chen, Elena Alshina, Gary J. Sullivan, Jens-Rainer, Jill Boyce, "Algorithm Description of Joint Exploration Test Model 7," JVET-G1001_v1, Joint Video Exploration Team (JVET) of ITU-T SG 16 WP 3 and ISO/IEC JTC 1/SC 29/WG 11 7th Meeting: Torino, IT, 13-2 1 Jul. 2017

In other words, the contents described in the above non patent literature also form the basis for determining support requirements. It is assumed, for example, that Quad-Tree Block Structure described in NPL 5 and QTBT (Quad Tree Plus Binary Tree) Block Structure described in NPL 6 are within the scope of disclosure of the present technology and satisfy support requirements for claims even without direct description in the embodiments. In addition, it is assumed that technical terms such as parsing, syntax, and semantics are similarly within the scope of the disclosure of the present technology and satisfy support requirements for claims even without direct description in the embodiments.

<Point Cloud>

Data such as a point cloud representing a three-dimensional structure by position information, attribute information, and the like regarding a point group, and a mesh including vertexes, edges, and surfaces and defining a three-dimensional shape using polygon representation has been conventionally present.

Figure 1B:
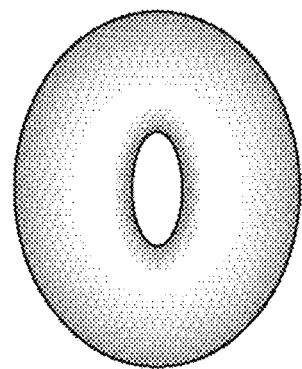
FIGS. 1A and 1B are explanatory diagrams of an example of a point cloud.
Figure 1A:
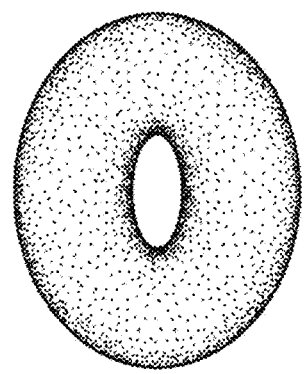

In the case of, for example, the point cloud, a stereoscopic structure depicted in FIG. 1A is represented as a set of many points (point group) depicted in FIG. 1B. In other words, point cloud data includes position information and attribute information (for example, a color) regarding each point in this point group. Therefore, a data structure is relatively simple, and any stereoscopic structure can be represented with sufficiently high precision by using sufficiently many points.

<Outline of Video-Based Approach>

A video-based approach has been proposed for projecting position information and color information regarding such a point cloud onto two-dimensional planes per small area and encoding the position information and the color information by an encoding method for two-dimensional images.

Figure 2:
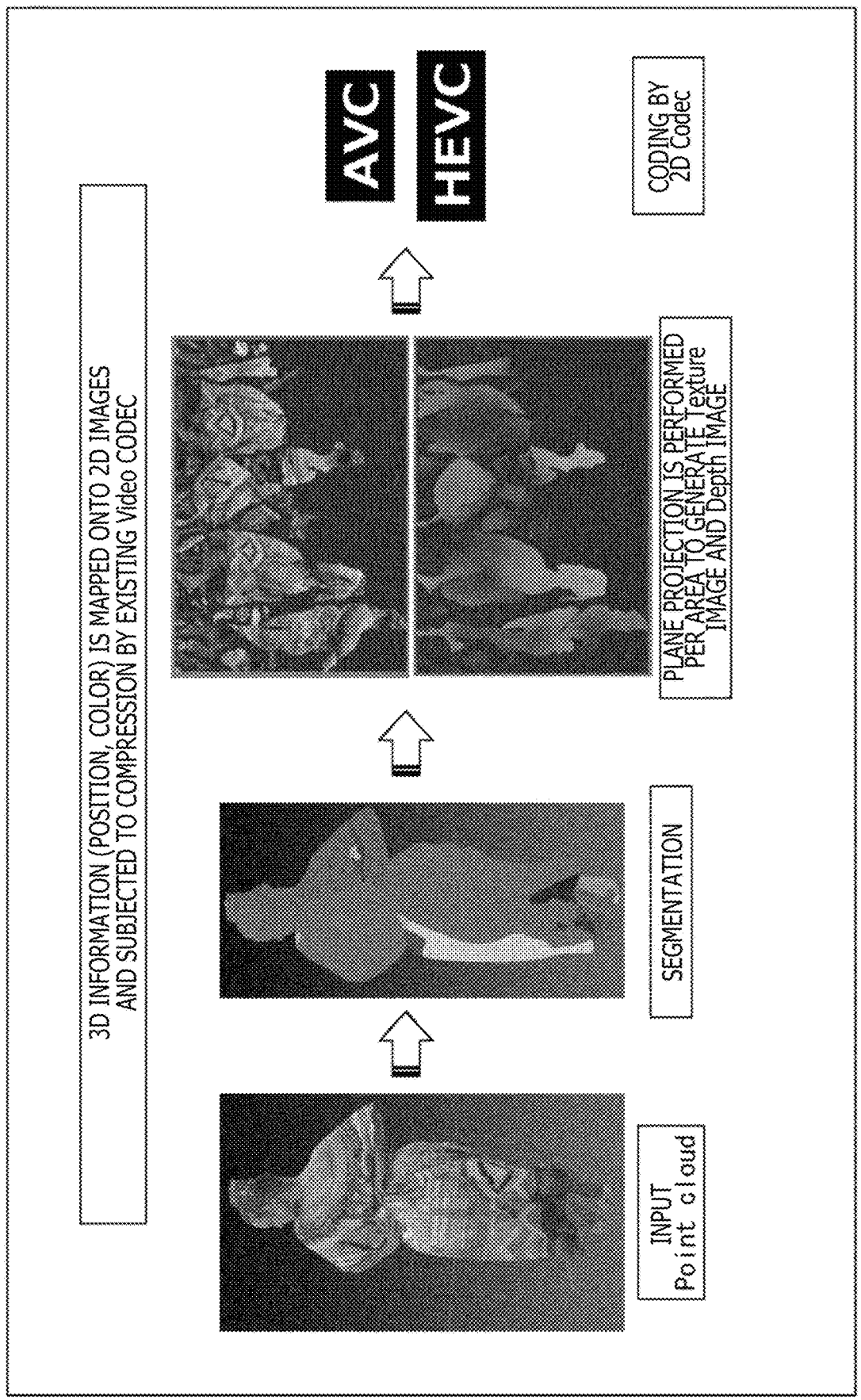
FIG. 2 is an explanatory diagram of an example of an outline of a video-based approach.

According to this video-based approach, an input point cloud is divided into a plurality of segments (also referred to as "areas" or "patches") and subjected to projection onto two-dimensional planes per area as depicted in, for example, FIG. 2. It is noted that data regarding each position of the point cloud (that is, data regarding each point) includes the position information (Geometry (also referred to as "Depth")) and the attribute information (Texture) as described above, and the position information and the attribute information are each projected onto a two-dimensional plane per area.

Further, 3D data (point cloud) projected onto the two-dimensional planes are encoded by an encoding approach for two-dimensional plane images such as AVC (Advanced Video Coding) or HEVC (High Efficiency Video Coding).

<Occupancy Map>

Figure 3:
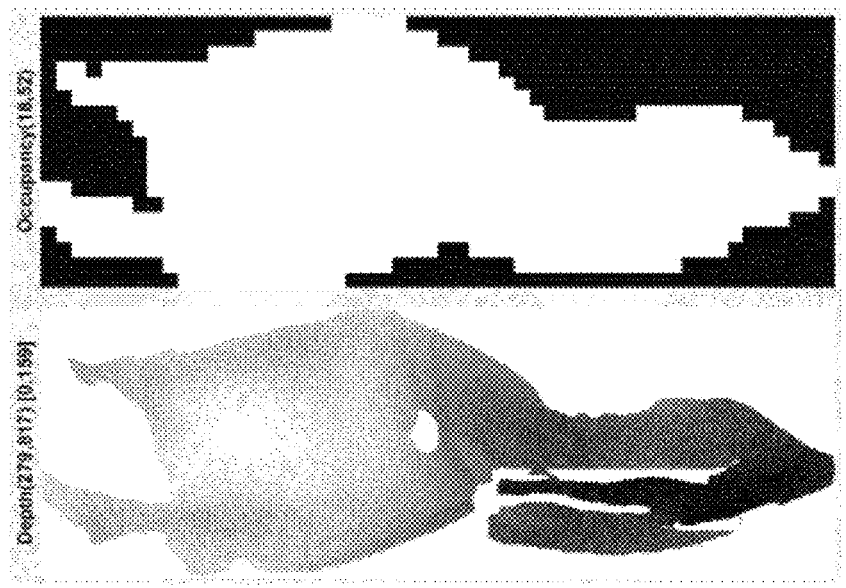
FIG. 3 is a diagram depicting an example of a geometry image and an occupancy map.

In the case of projecting the 3D data onto two-dimensional planes by the video-based approach, an occupancy map depicted in FIG. 3 is generated in addition to a two-dimensional plane image onto which the position information is projected (also referred to as "Geometry image") and a two-dimensional plane image onto which the attribute information is projected (also referred to as "Texture image") as described above. The occupancy map is map information indicating whether or not the position information and the attribute information are present at each position on the two-dimensional planes. In the example of FIG. 3, the geometry image (Depth) and the occupancy map (Occupancy) (of patches) at corresponding positions are arranged side by side. In the case of the example of FIG. 3, a white part of the occupancy map (left side in FIG. 3) indicates a position (coordinates) at/in which data (that is, position information) regarding the geometry image is present, and a black part indicates a position (coordinates) at/in which the data (that is, position information) regarding the geometry image is not present.

Figure 4:
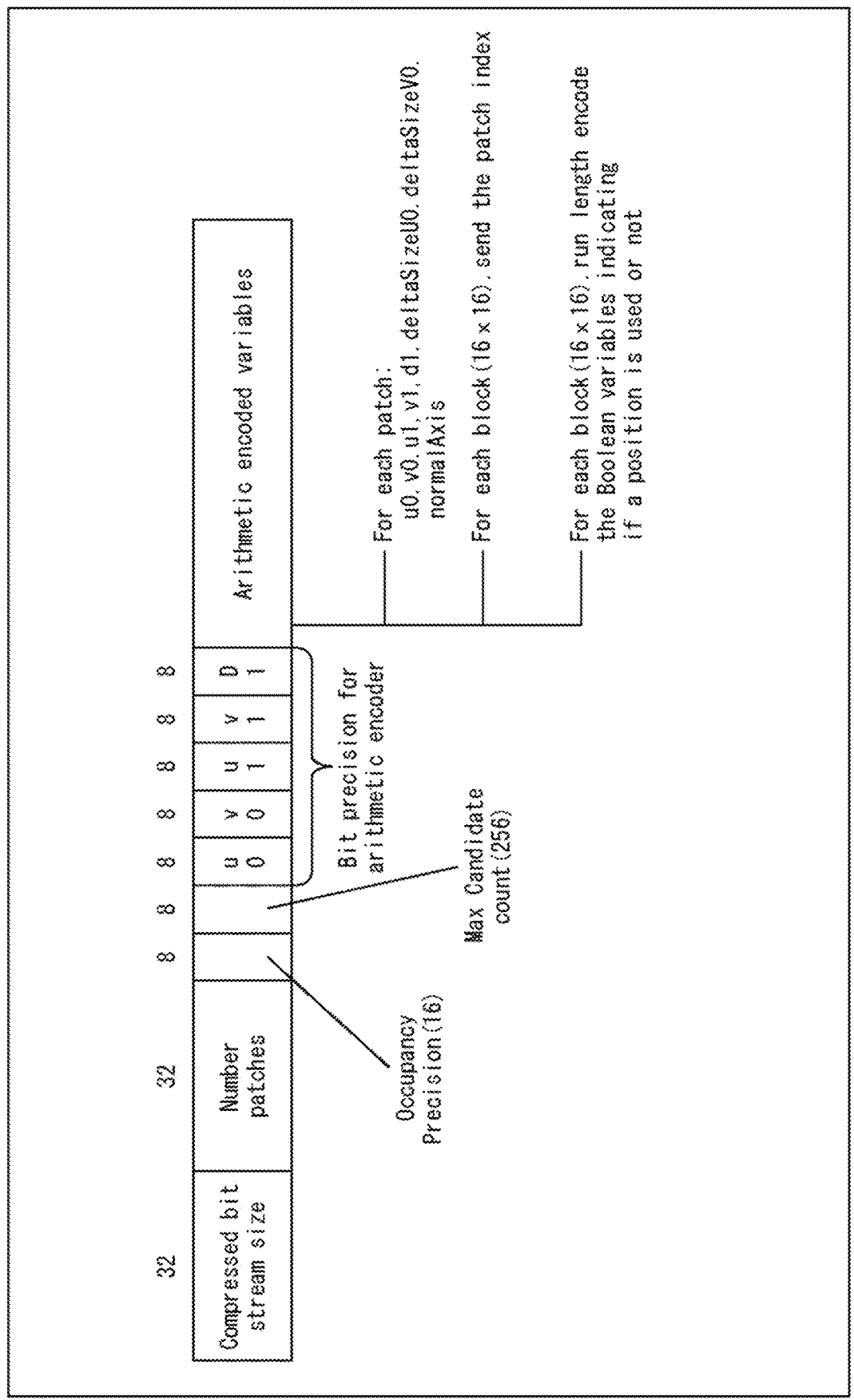
FIG. 4 is an explanatory diagram of an example of a data structure of the occupancy map.

FIG. 4 depicts an example of a data structure of the occupancy map. The occupancy map contains data as depicted in FIG. 4.

For example, coordinate information (u0,v01) and (u1,v1) indicating a range of each patch is stored in Arithmetic encoded variables. In other words, in the occupancy map, the range of each patch area is indicated by coordinates of opposite vertices ((u0,v0) and (u1,v1)).

<Present Technology Associated with Video-Based Approach>

The present technology associated with the video-based approach described above will be described. FIG. 5 is a list of the present technology to be described in the embodiments.

In the case of a conventional method, sizes (resolutions) of the occupancy map, the geometry image (Geometry), and the texture image (Texture) are limited to be identical (1:1:1), as depicted on a first row (except for a row of item names) from the top of this table.

Figure 6:
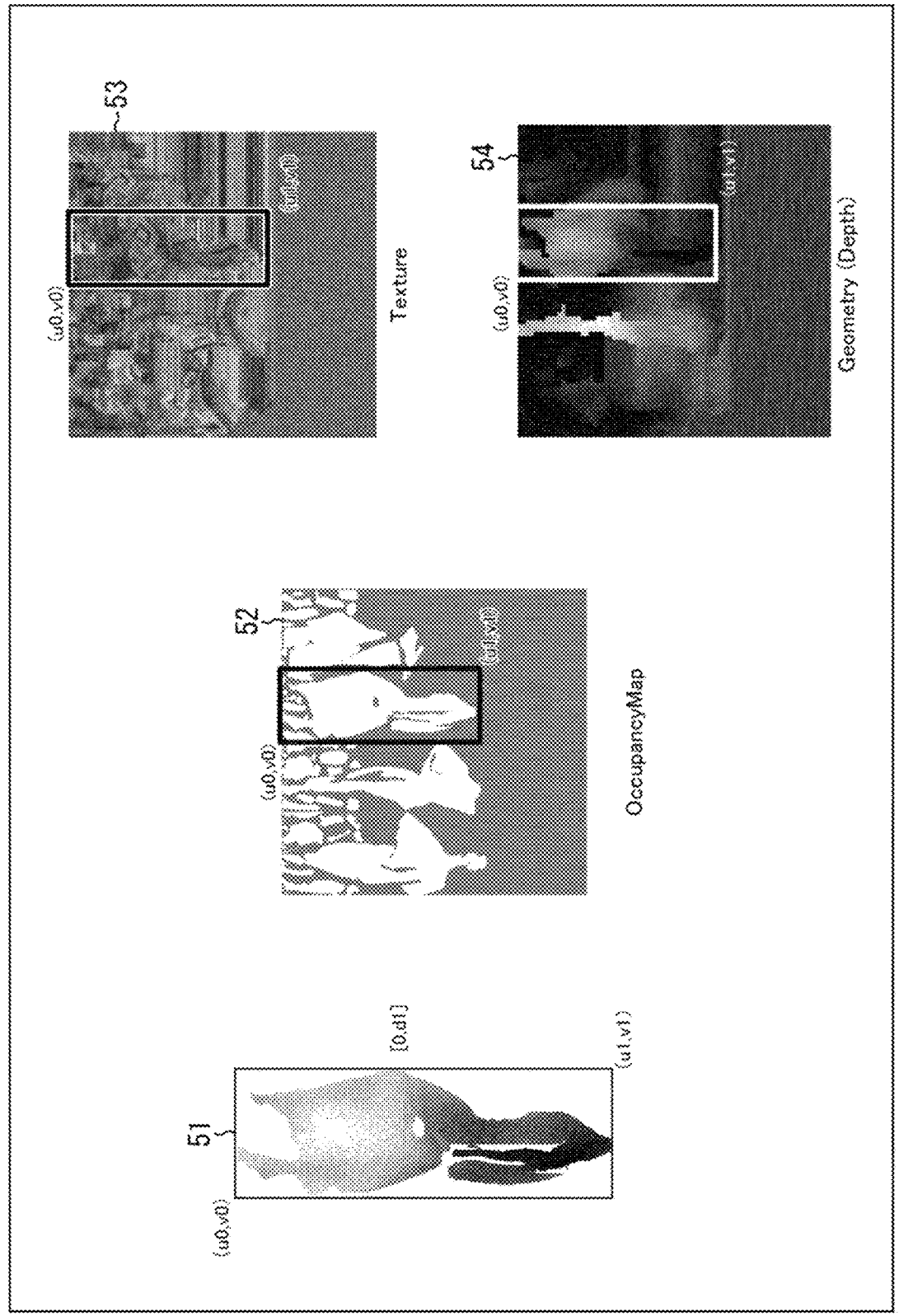
FIG. 6 is a diagram depicting a correspondence relation among identical patch areas.

For example, as depicted in FIG. 6, a patch 51 is disposed at an identical position and at an identical magnitude in any of an occupancy map 52, a texture image 53, and a geometry image 54. In other words, in any of the images, coordinates of opposite vertices of the patch 51 are (u0,v0) and (u1,v1). All patches are similarly disposed.

Owing to this, objects to be encoded and functionality of compression are limited, possibly resulting in a reduction in encoding efficiency. For example, 3D data different in dimension between the position information and the color information, such as 3D data including mesh and texture, is difficult to encode by this video-based approach. It is also difficult to make a resolution of the geometry image different from a resolution of the texture image. In addition, it is difficult to control a resolution in response to types of pictures such as I pictures, P pictures, and B pictures. It is also difficult to control a resolution per area.

Such limitations imposed on encoding possibly cause a reduction in encoding efficiency. In other words, such limitations imposed on the encoding possibly cause a reduction in a quality of 3D data.

To address the problem, a bit stream containing: information indicating a correspondence relation between at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present at each position; and encoded data regarding the geometry image, encoded data regarding the texture image, and encoded data regarding the occupancy map is generated.

For example, an image processing apparatus includes a bit stream generation section that generates a bit stream, the bit stream containing: information indicating a correspondence relation between at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present at each position; and encoded data regarding the geometry image, encoded data regarding the texture image, and encoded data regarding the occupancy map.

With this configuration, a decoding side can correctly grasp the correspondence relation between the geometry image and the texture image, and the occupancy map on the basis of the information indicating the correspondence relation; thus, it is possible to correctly reconstruct 3D data without making identical resolutions and the like of these images and the map. Therefore, the limitations described above can be avoided, so that it is possible to perform diverse encoding and improve encoding efficiency. In other words, it is possible to suppress a reduction in encoding efficiency.

Furthermore, each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position is unpacked on the basis of information indicating a correspondence relation between at least one of the geometry image or the texture image and the occupancy map.

For example, an unpacking section is provided which unpacks each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

By doing so, it is possible to correctly grasp the correspondence relation between the geometry image and the texture image, and the occupancy map on the basis of the information indicating the correspondence relation. It is, therefore, possible to correctly reconstruct 3D data without making identical the resolutions and the like of these images and the map. Therefore, the limitations described above can be avoided, so that it is possible to perform diverse encoding and improve encoding efficiency. In other words, it is possible to suppress a reduction in encoding efficiency.

For example, as in "method 1" described in a second row (except for the row of item names) from the top of the table of FIG. 5, a frame-level resolution of each of the geometry image and the texture image may be set different from a frame-level resolution of the occupancy map. It is noted that the frame-level resolution is identical between the geometry image and the texture image.

If the resolution of the occupancy map is, for example, W*H, the resolution of each of the geometry image and the texture image may be set to w*h (w=$\alpha$W, h=$\beta$H, 1>$\alpha$>0, and 1>$\beta$>0).

By doing so, it is possible to control a quality in response to types of pictures such as control to reduce the quality (resolution and the like) of P pictures and B pictures and to improve the quality (resolution and the like) of I pictures. It is, therefore, possible to suppress a reduction in encoding efficiency.

In this case, signaling variables $\alpha$ and $\beta$, to a bit stream (for example, containing variables $\alpha$ and $\beta$, in a header) enables the decoding side to correctly grasp the resolution of the geometry image and the texture image. It is, therefore, possible to correctly reconstruct 3D data.

Furthermore, for example, as in "method 2" described in a third row (except for the row of item names) from the top of the table of FIG. 5, the resolution of the geometry image may be set different from the resolution of the texture image.

If the resolution of the occupancy map is, for example, W*H, then the resolution of the geometry image may be set to w*h (w=$\alpha_g$W, h=$\beta_g$H, 1>$\alpha_g$>0, and 1>$\beta_g$>0), and the resolution of the texture image may be set to w*h (w=$\alpha_t$W, h=$\beta_t$H, 1>$\alpha_t$>0, and 1>$\beta_t$>0).

By doing so, it is possible to handle 3D data different in, for example, resolution between the geometry image and the texture image. Furthermore, it is possible to perform encoding in light of an influence on a subjective image quality and, therefore, to suppress a reduction in encoding efficiency.

In this case, signaling variables $\alpha_g$, $\beta_g$, $\alpha_t$, and $\beta_t$ to a bit stream (for example, containing variables $\alpha_g$, $\beta_g$, $\alpha_t$, and $\beta_t$ in a header) enables the decoding side to correctly grasp the resolutions of the geometry image and the texture image. It is, therefore, possible to correctly reconstruct 3D data.

Moreover, for example, as in "method 3" described in a fourth row (except for the row of item names) from the top of the table of FIG. 5, a per-patch position and a per-patch resolution of each of the geometry image and the texture image may be set different from a per-patch position and a per-patch resolution of the occupancy map. It is noted that the per-patch position and the per-patch resolution are identical between the geometry image and the texture image.

For example, coordinates of opposite vertices of a certain patch on the occupancy map may be set to (u0,v0) and (u1,v1), coordinates of opposite vertices of the patch on the geometry image and the texture image may be set to (u'0,v'0) and (u'1,v'1), and the coordinates may be made to correspond to one another. In other words, information indicating a range of the patch on each image may be made to correspond to one another.

By doing so, it is possible to, for example, make adjustment of an image quality (resolution) per area. It is, therefore, possible to improve encoding efficiency of subsequent video codec.

In this case, information (u'0,v'0) and (u'1,v'1) may be added (made to correspond) to information regarding each patch on the occupancy map (FIG. 4). For example, this information (u'0,v'0) and (u'1,v'1) may be added to the information such as (u0,v0) and (u1,v1) regarding each patch contained in arithmetic encoded variables described above. This makes it possible to manage the coordinates of opposite vertices per patch. It is, therefore, possible for the decoding side to easily grasp (a range of) an area corresponding to a desired patch on each image.

Furthermore, for example, as in "method 4" described in a fifth row (except for the row of item names) from the top of the table of FIG. 5, the per-patch position and the per-patch resolution of the geometry image may be set different from the per-patch position and the per-patch resolution of the texture image.

For example, coordinates of opposite vertices of a certain patch on the occupancy map may be set to (u0,v0) and (u1,v1), coordinates of opposite vertices of the patch on the geometry image may be set to (ug0,vg0) and (ug1,vg1), and coordinates of opposite vertices of the patch on the texture image may be set to (ut0,vt0) and (ut1,vt1), and the coordinates may be made to correspond to one another. In other words, information indicating a range of the patch on each image may be made to correspond to one another.

By doing so, it is possible to, for example, make adjustment of an image quality (resolution) per area. It is, therefore, possible to improve encoding efficiency of subsequent video codec. It is also possible to handle 3D data different in resolution between the geometry image and the texture image. Furthermore, it is possible to perform encoding in light of an influence on a subjective image quality and, therefore, to suppress a reduction in encoding efficiency.

In this case, information regarding ug0,vg0, ug1,vg1, ut0,vt0, and ut1,vt1 may be added (made to correspond) to the information regarding each patch on the occupancy map (FIG. 4). For example, this information regarding ug0,vg0, ug1,vg1, ut0,vt0, and ut1,vt1 may be added to the information such as u0,v0 and u1,v1 regarding each patch contained in Arithmetic encoded variables described above. This makes it possible to manage the coordinates of opposite vertices per patch. It is, therefore, possible for the decoding side to easily grasp (a range of) an area corresponding to a desired patch on each image.

It is noted that in a case in which the decoding side reconstructs the 3D data using the geometry image and the texture image the resolutions, the positions, and the like of which are changed as described above, it is possible to reconstruct the 3D data by a method similar to a conventional method by setting the positions and the resolutions of the geometry image and the texture image identical to those of the occupancy map and then performing unpacking.

However, if pixel-level positions on the images are made to correspond to one another, it is possible to reconstruct the 3D data by performing unpacking without making adjustment of images (conversion of the positions and the resolutions) of the geometry image and the texture image as in, for example, "method 5" described in a sixth row (except for the row of item names) from the top of the table of FIG. 5. It is, therefore, possible to suppress growth of a processing load on the decoding side.

In this case, table information indicating a pixel-level correspondence relation between the occupancy map, and the geometry image and the texture image, for example, is added to the occupancy map. This makes it possible to correctly reconstruct the 3D data using this table information.

<Encoding Apparatus>

Figure 7:
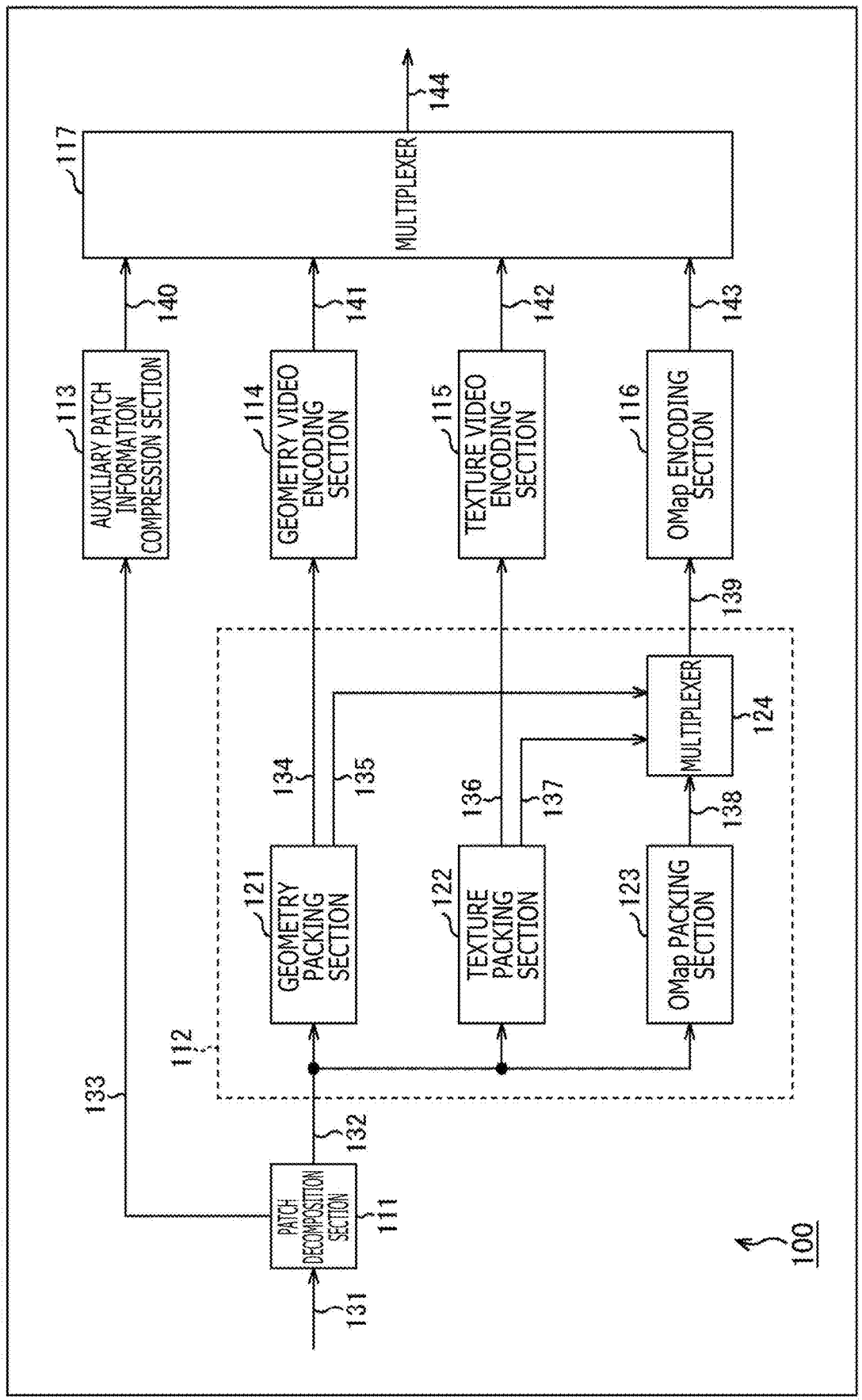
FIG. 7 is a block diagram depicting an example of principal configurations of an encoding apparatus.

Next, configurations for realizing approaches described above will be described. FIG. 7 is a block diagram depicting an example of configurations of an encoding apparatus that is one aspect of an image processing apparatus to which the present technology is applied. An encoding apparatus 100 depicted in FIG. 7 is an apparatus that projects 3D data such as a point cloud onto two-dimensional planes and performing encoding by an encoding method for two-dimensional images.

The encoding apparatus 100 implements, for example, the technologies described in NPL 1 to NPL 6 and performs 3D data encoding by a method compliant with standards described in any of those documents.

It is noted that principal configurations such as processing sections and flows of data are depicted in FIG. 7 and are not necessarily all configurations. In other words, processing sections that are not depicted as blocks in FIG. 7 may be present or processing and flows of data that are not indicated by arrows or the like in FIG. 7 may be present in the encoding apparatus 100.

As depicted in FIG. 7, the encoding apparatus 100 has a patch decomposition section 111, a packing section 112, an auxiliary patch information compression section 113, a geometry video encoding section 114, a texture video encoding section 115, an OMap encoding section 116, and a multiplexer 117.

The patch decomposition section 111 performs processing associated with decomposition of 3D data. For example, the patch decomposition section 111 acquires 3D data representing a three-dimensional structure (for example, a point cloud) input to the encoding apparatus 100 (arrow 131). In addition, the patch decomposition section 111 decomposes the acquired 3D data into a plurality of patches, projects the 3D data onto two-dimensional planes per patch, and generates a geometry image, a texture image, and an occupancy map.

The patch decomposition section 111 supplies these images and the map to the packing section 112 (arrow 132). Furthermore, the patch decomposition section 111 supplies auxiliary patch information that is information associated with the decomposition to the auxiliary patch information compression section 113 (arrow 133).

The packing section 112 performs processing associated with data packing. For example, the packing section 112 acquires the geometry image, the texture image, and the occupancy map supplied from the patch decomposition section 111 (arrow 132). In addition, the packing section 112 packs each of the acquired geometry image, texture image, and occupancy map as video frames.

The packing section 112 supplies the generated video frames to subsequent processing sections. For example, the packing section 112 supplies the video frame of the generated geometry image to the geometry video encoding section 114 (arrow 134). In addition, for example, the packing section 112 supplies the video frame of the generated texture image to the texture video encoding section 115 (arrow 136). Furthermore, for example, the packing section 112 supplies the video frame of the generated occupancy map to the OMap encoding section 116 (arrow 139).

The auxiliary patch information compression section 113 performs processing associated with compression of the auxiliary patch information. For example, the auxiliary patch information compression section 113 acquires the data supplied from the patch decomposition section 111 (arrow 133). The auxiliary patch information compression section 113 encodes (compresses) the auxiliary patch information contained in the acquired data. The auxiliary patch information compression section 113 supplies obtained encoded data regarding the auxiliary patch information to the multiplexer 117 (arrow 140).

The geometry video encoding section 114 performs processing associated with encoding of the video frame of the geometry image. For example, the geometry video encoding section 114 acquires the video frame of the geometry image supplied from the packing section 112 (arrow 134). Furthermore, the geometry video encoding section 114 encodes the acquired video frame of the geometry image by any encoding method for two-dimensional images such as AVC or HEVC. The geometry video encoding section 114 supplies the encoded data obtained by the encoding (encoded data regarding the video frame of the geometry image) to the multiplexer 117 (arrow 141).

The texture video encoding section 115 performs processing associated with encoding of the video frame of the texture image. For example, the texture video encoding section 115 acquires the video frame of the texture image supplied from the packing section 112 (arrow 136). Furthermore, the texture video encoding section 115 encodes the acquired video frame of the texture image by any encoding method for two-dimensional images such as the AVC or the HEVC. The texture video encoding section 115 supplies the encoded data obtained by the encoding (encoded data regarding the video frame of the texture image) to the multiplexer 117 (arrow 142).

The OMap encoding section 116 performs processing associated with encoding of the video frame of the occupancy map. For example, the OMap encoding section 116 acquires the video frame of the occupancy map supplied from the packing section 112 (arrow 139). In addition, the OMap encoding section 116 encodes the acquired video frame of the occupancy map by any encoding method for two-dimensional images such as the AVC or the HEVC. The OMap encoding section 116 supplies the encoded data obtained by the encoding (encoded data regarding the video frame of the occupancy map) to the multiplexer 117 (arrow 143).

The multiplexer 117 performs processing associated with multiplexing. For example, the multiplexer 117 acquires the encoded data regarding the auxiliary patch information supplied from the auxiliary patch information compression section 113 (arrow 140). In addition, for example, the multiplexer 117 acquires the encoded data regarding the video frame of the geometry image supplied from the geometry video encoding section 114 (arrow 141). Furthermore, for example, the multiplexer 117 acquires the encoded data regarding the video frame of the texture image supplied from the texture video encoding section 115 (arrow 142). Moreover, for example, the multiplexer 117 acquires the encoded data regarding the video frame of the occupancy map supplied from the OMap encoding section 116 (arrow 143).

The multiplexer 117 multiplexes those pieces of acquired information and generates a bit stream. The multiplexer 117 outputs the generated bit stream to outside of the encoding apparatus 100 (arrow 144).

As depicted in FIG. 7, the packing section 112 has a geometry packing section 121, a texture packing section 122, an OMap packing section 123, and a multiplexer 124.

The geometry packing section 121 performs processing associated with packing of the geometry image. For example, the geometry packing section 121 acquires the geometry image supplied from the patch decomposition section 111 (arrow 132). The geometry packing section 121 packs the acquired geometry image as the video frame. The geometry packing section 121 supplies the obtained video frame of the geometry image to the geometry video encoding section 114 (arrow 134). In addition, the geometry packing section 121 supplies information associated with the geometry image (for example, information such as an address) to the multiplexer 124 (arrow 135).

The texture packing section 122 performs processing associated with packing of the texture image. For example, the texture packing section 122 acquires the texture image supplied from the patch decomposition section 111 (arrow 132). The texture packing section 122 packs the acquired texture image as the video frame. The texture packing section 122 supplies the obtained video frame of the texture image to the texture video encoding section 115 (arrow 136). In addition, the texture packing section 122 supplies information associated with the texture image (for example, information such as an address) to the multiplexer 124 (arrow 137).

The OMap packing section 123 performs processing associated with packing of the occupancy map. For example, the OMap packing section 123 acquires the occupancy map supplied from the patch decomposition section 111 (arrow 132). The OMap packing section 123 packs the acquired occupancy map as the video frame. The OMap packing section 123 supplies the obtained video frame of the occupancy map to the multiplexer 124 (arrow 138).

The multiplexer 124 performs processing associated with multiplexing. For example, the multiplexer 124 acquires the information associated with the geometry image from the geometry packing section 121 (arrow 135). In addition, the multiplexer 124 acquires the information associated with the texture image from the texture packing section 122 (arrow 137). Furthermore, the multiplexer 124 acquires the information regarding the video frame or the like of the occupancy map from the OMap packing section 123 (arrow 138).

The multiplexer 124 multiplexes those pieces of information. In other words, the multiplexer 124 embeds the information associated with the geometry image and the texture image into the video frame of the occupancy map. The multiplexer 124 supplies the video frame of the occupancy map into which the information associated with the geometry image and the texture image is multiplexed in this way to the OMap encoding section 116 (arrow 139).

In this way, the packing section 112 packs the geometry image, the texture image, and the occupancy map by the packing sections independent of one another. In other words, the packing section 112 can pack the geometry image, the texture image, and the occupancy map independently of one another. In other words, the packing section 112 can pack each of the geometry image, the texture image, and the occupancy map in such a manner, for example, that frame-level resolution of each of the geometry image and the texture image, the per-patch position and the per-patch resolution of each of the geometry image and the texture image, and the like differ from those of the occupancy map.

<Decoding Apparatus>

Figure 8:
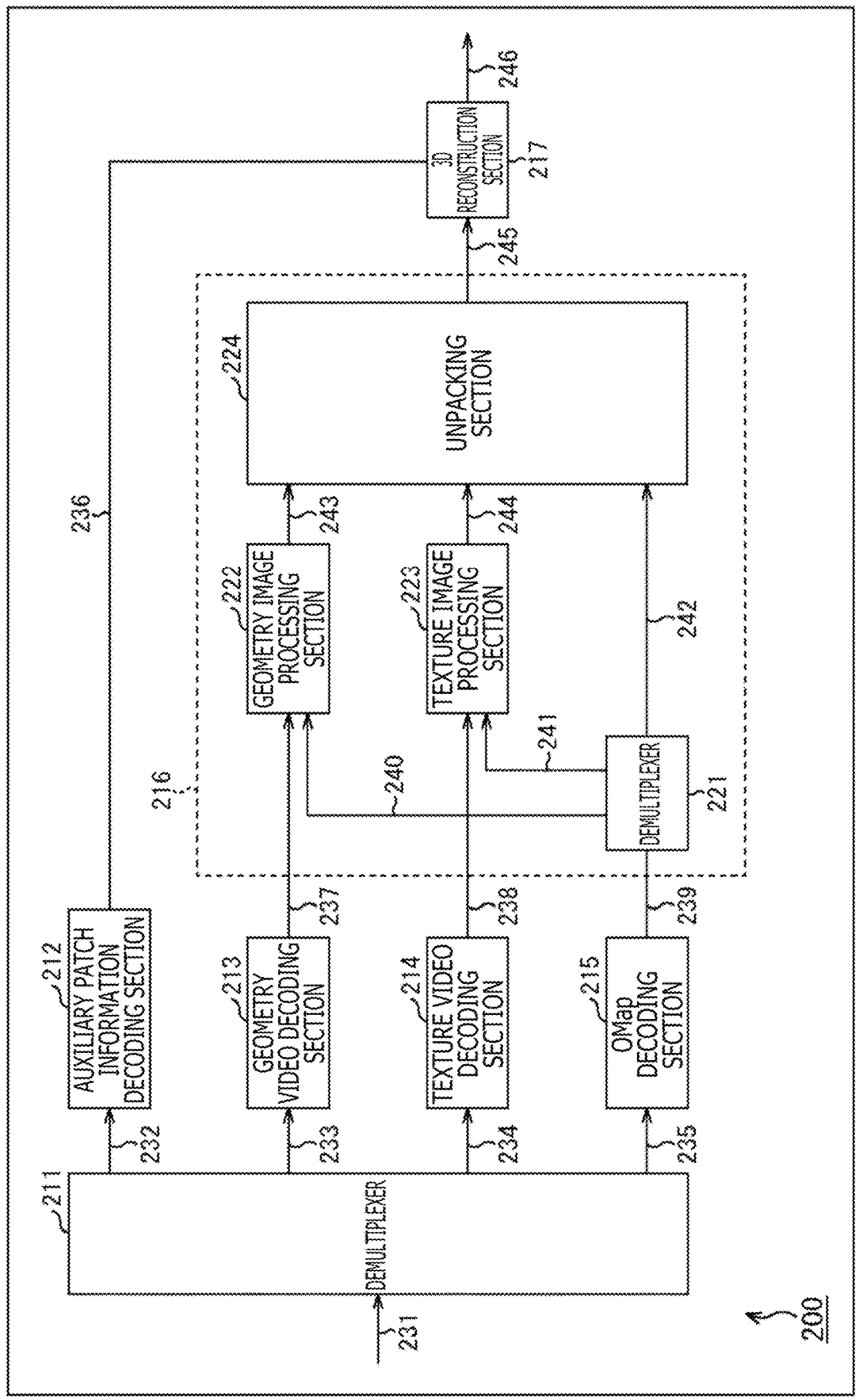
FIG. 8 is a block diagram depicting an example of principal configurations of a decoding apparatus.

FIG. 8 is a block diagram depicting an example of configurations of a decoding apparatus that is one aspect of the image processing apparatus to which the present technology is applied. A decoding apparatus 200 depicted in FIG. 8 is an apparatus that decodes encoded data obtained by projecting 3D data such as the point cloud onto two-dimensional planes and encoding the projected data by a decoding method for two-dimensional images and that projects the decoded data onto a three-dimensional space.

The decoding apparatus 200 implements, for example, the technologies described in NPL 1 to NPL 6 and performs decoding of encoded data of 3D data by a method compliant with standards described in any of those documents.

It is noted that principal configurations such as processing sections and flows of data are depicted in FIG. 8 and are not necessarily all configurations. In other words, processing sections that are not depicted as blocks in FIG. 8 may be present or processing and flows of data that are not indicated by arrows or the like in FIG. 8 may be present in the decoding apparatus 200.

As depicted in FIG. 8, the decoding apparatus 200 has a demultiplexer 211, an auxiliary patch information decoding section 212, a geometry video decoding section 213, a texture video decoding section 214, an OMap decoding section 215, an unpacking section 216, and a 3D reconstruction section 217.

The demultiplexer 211 performs processing associated with data demultiplexing. For example, the demultiplexer 211 acquires the bit stream input to the decoding apparatus 200 (arrow 231). This bit stream is supplied by, for example, the encoding apparatus 100. The demultiplexer 211 demultiplexes this bit stream, extracts the encoded data regarding the auxiliary patch information, and supplies the encoded data to the auxiliary patch information decoding section 212 (arrow 232). In addition, the demultiplexer 211 extracts the encoded data regarding the video frame of the geometry image from the bit stream by demultiplexing and supplies the encoded data to the geometry video decoding section 213 (arrow 233). Furthermore, the demultiplexer 211 extracts the encoded data regarding the video frame of the texture image from the bit stream by demultiplexing and supplies the encoded data to the texture video decoding section 214 (arrow 234). Moreover, the demultiplexer 211 extracts the encoded data regarding the video frame of the occupancy map from the bit stream by demultiplexing and supplies the encoded data to the OMap decoding section 215 (arrow 235).

The auxiliary patch information decoding section 212 performs processing associated with decoding of the encoded data regarding the auxiliary patch information. For example, the auxiliary patch information decoding section 212 acquires the encoded data regarding the auxiliary patch information supplied from the demultiplexer 211 (arrow 232). Furthermore, the auxiliary patch information decoding section 212 decodes the encoded data regarding the auxiliary patch information contained in the acquired data. The auxiliary patch information decoding section 212 supplies the auxiliary patch information obtained by the decoding to the 3D reconstruction section 217 (arrow 236).

The geometry video decoding section 213 performs processing associated with decoding of the encoded data regarding the video frame of the geometry image. For example, the geometry video decoding section 213 acquires the encoded data regarding the video frame of the geometry image supplied from the demultiplexer 211 (arrow 233). In addition, for example, the geometry video decoding section 213 decodes the acquired encoded data and obtains the video frame of the geometry image. The geometry video decoding section 213 supplies the video frame of the geometry image to unpacking section 216 (arrow 237).

The texture video decoding section 214 performs processing associated with decoding of the encoded data regarding the video frame of the texture image. For example, the texture video decoding section 214 acquires the encoded data regarding the video frame of the texture image supplied from the demultiplexer 211 (arrow 234). In addition, for example, the texture video decoding section 214 decodes the acquired encoded data and obtains the video frame of the texture image. The texture video decoding section 214 supplies the video frame of the texture image to the unpacking section 216 (arrow 238).

The OMap decoding section 215 performs processing associated with decoding of the encoded data regarding the video frame of the occupancy map. For example, the OMap decoding section 215 acquires the encoded data regarding the video frame of the occupancy map supplied from the demultiplexer 211 (arrow 235). In addition, for example, the OMap decoding section 215 decodes the acquired encoded data and obtains the video frame of the occupancy map. The OMap decoding section 215 supplies the video frame of the occupancy map to the unpacking section 216 (arrow 239).

The unpacking section 216 performs processing associated with unpacking. For example, the unpacking section 216 acquires the video frame of the geometry image from the geometry video decoding section 213 (arrow 237), acquires the video frame of the texture from the texture video decoding section 214 (arrow 238), and acquires the video frame of the occupancy map from the OMap decoding section 215 (arrow 239). The unpacking section 216 unpacks each of these video frames. The unpacking section 216 supplies the geometry image, the texture image, and the occupancy map obtained by unpacking to the 3D reconstruction section 217 (arrow 245).

The 3D reconstruction section 217 performs processing associated with reconstruction of 3D data. For example, the 3D reconstruction section 217 acquires the auxiliary patch information supplied from the auxiliary patch information decoding section 212 (arrow 236). In addition, the 3D reconstruction section 217 acquires the geometry image, the texture image, and the occupancy map supplied from the unpacking section 216 (arrow 245). The 3D reconstruction section 217 reconstructs the 3D data on the basis of those pieces of information. The 3D reconstruction section 217 outputs the 3D data obtained by such processing to outside of the decoding apparatus 200 (arrow 246).

This 3D data is supplied to, for example, a display section to display an image of the 3D data, recorded in a recording medium, and/or supplied to another apparatus via communication.

As depicted in FIG. 8, the unpacking section 216 has a demultiplexer 221, a geometry image processing section 222, a texture image processing section 223, and an unpacking section 224.

The demultiplexer 221 performs processing associated with demultiplexing. For example, the demultiplexer 221 acquires the video frame of the occupancy map supplied from the OMap decoding section 215 (arrow 239). The demultiplexer 221 demultiplexes the video frame of the occupancy map and extracts information associated with the geometry image and information associated with the texture image. The information associated with the geometry image and the information associated with the texture image each contain, for example, address information.

The demultiplexer 221 supplies the extracted information associated with the geometry image to the geometry image processing section 222 (arrow 240). In addition, the demultiplexer 221 supplies the extracted information associated with the texture image to the texture image processing section 223 (arrow 241). Furthermore, the demultiplexer 221 supplies the video frame of the occupancy map to the unpacking section 224 (arrow 242).

The geometry image processing section 222 performs processing associated with image processing on the geometry image. For example, the geometry image processing section 222 acquires the video frame of the geometry image supplied from the geometry video decoding section 213 (arrow 237). In addition, the geometry image processing section 222 acquires the information associated with the geometry image supplied from the demultiplexer 221 (arrow 240).

The geometry image processing section 222 performs image processing on the video frame of the geometry image on the basis of those pieces of information. For example, the geometry image processing section 222 updates the video frame of the geometry image in such a manner that an overall resolution and of the geometry image a per-patch position and a per-patch resolution of the geometry image are set identical to those of the occupancy map by the image processing. The geometry image processing section 222 supplies the video frame, which has been subjected to the image processing, of the geometry image to the unpacking section 224 (arrow 243).

Furthermore, the texture image processing section 223 performs processing associated with image processing on the texture image. For example, the texture image processing section 223 acquires the video frame of the texture image supplied from the texture video decoding section 214 (arrow 238). Furthermore, the texture image processing section 223 acquires the information associated with the texture image supplied from the demultiplexer 221 (arrow 241).

The texture image processing section 223 performs image processing on the video frame of the texture image on the basis of those pieces of information. For example, the texture image processing section 223 updates the video frame of the texture image in such a manner that an overall resolution of the texture image and a per-patch position and a per-patch resolution of the texture image are set identical to those of the occupancy map by the image processing. The texture image processing section 223 supplies the video frame, which has been subjected to the image processing, of the texture image to the unpacking section 224 (arrow 244).

The unpacking section 224 performs processing associated with unpacking. For example, the unpacking section 224 acquires the video frame of the occupancy map supplied from the demultiplexer 221 (arrow 242). In addition, the unpacking section 224 acquires the video frame of the geometry image supplied from the geometry image processing section 222 (arrow 243). Furthermore, the unpacking section 224 acquires the video frame of the texture image supplied from the texture image processing section 223 (arrow 244).

The unpacking section 224 unpacks each of those video frames. In other words, the unpacking section 224 unpacks the video frame of the geometry image and obtains the geometry image. In addition, the unpacking section 224 unpacks the video frame of the texture image and obtains the texture image. Furthermore, the unpacking section 224 unpacks the video frame of the occupancy map and obtains the occupancy map.

The unpacking section 224 supplies the data obtained by such processing, which is, for example, information regarding the geometry image, the texture image, and the occupancy map, to the 3D reconstruction section 217 (arrow 245.)

In other words, the unpacking section 216 updates the geometry image and the texture image in such a manner that the resolutions of the geometry image and the texture image and the per-patch positions and the per-patch resolutions of the geometry image and the texture image, and the like are set identical to those of the occupancy map. In other words, the unpacking section 216 (unpacking section 224) performs unpacking in a state in which the geometry image, the texture image, and the occupancy map are identical in overall resolution of the image, and in per-patch position and per-patch resolution, and the like (for example, a state in the example of FIG. 6). The unpacking section 216 can, therefore, correctly perform unpacking.

Details of the methods depicted in FIG. 5 will next be described.

2. First Embodiment

<Common Overall Resolution>

Figure 9:
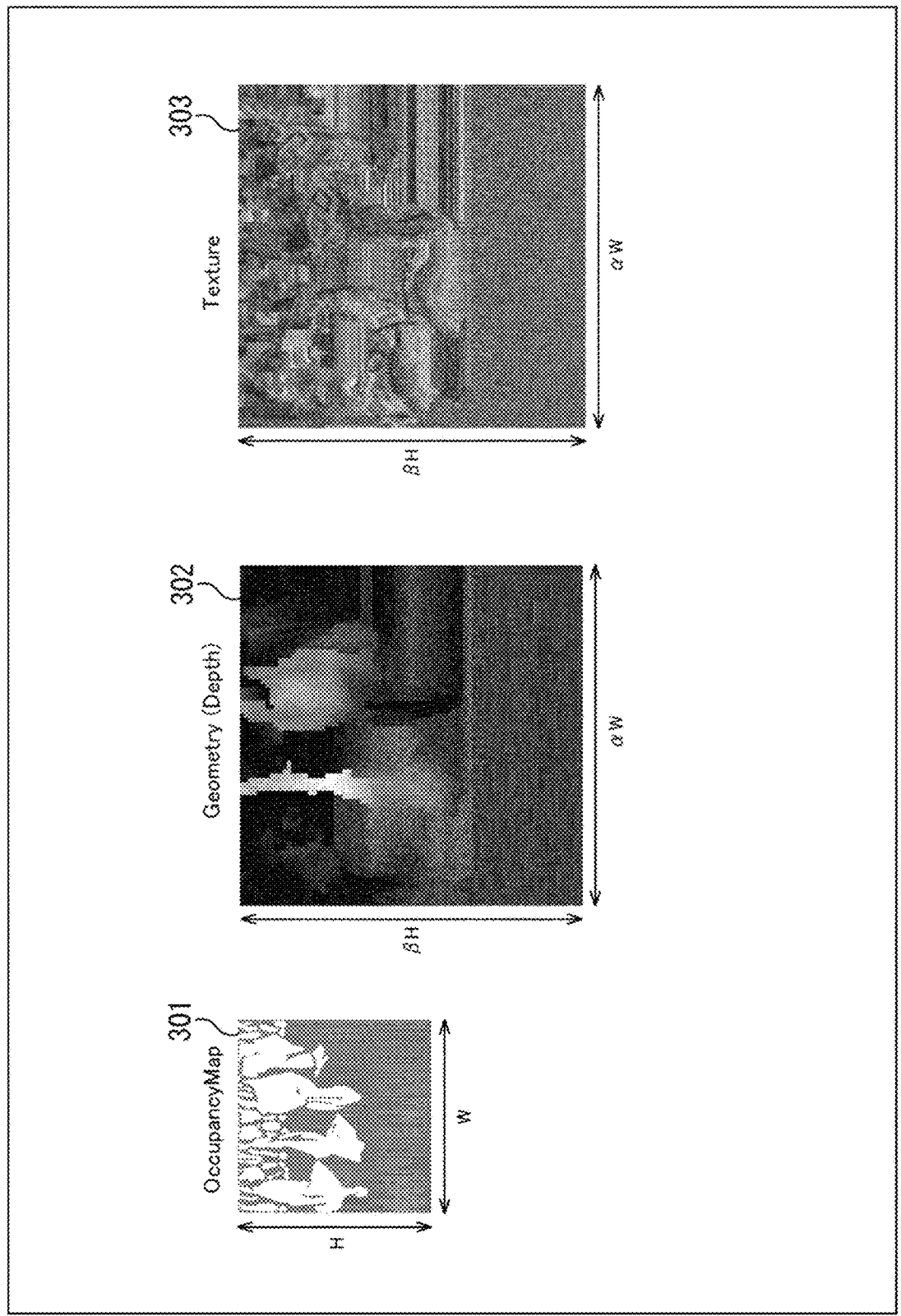
FIG. 9 is a diagram depicting an example of comparison of images.

The method 1 depicted in the table of FIG. 5 will be described. In this case, the frame-level resolution of each of the geometry image and the texture image differs from the resolution of the occupancy map. For example, as depicted in FIG. 9, the size of an occupancy map 301 is W*H and the size of each of a geometry image 302 and a texture image 303 is $\alpha W*\beta H$.

In such a case, the multiplexer 124 in the encoding apparatus 100 generates a bit stream containing the information indicating the correspondence relation in resolution between the geometry image and texture image, and the occupancy map, and the encoded data regarding the geometry image, the encoded data regarding the texture image, and the encoded data regarding the occupancy map by performing multiplexing.

This information indicating the correspondence relation in resolution contains information indicating a correspondence relation in resolution in a horizontal direction and information indicating a correspondence relation in resolution in a vertical direction. This information indicating the correspondence relation in resolution in the horizontal direction contains, for example, the variable $\alpha$ described above. In addition, this information indicating the correspondence relation in resolution in the vertical direction contains, for example, the variable $\beta$, described above. In other words, the variables $\alpha$ and $\beta$, are, for example, signaled to the bit stream (stored in the bit stream and provided to the decoding side). Such information may be stored in, for example, a header of the bit stream.

<Flow of Encoding Processing>

An example of a flow of encoding processing executed by the encoding apparatus 100 in this case will be described with reference to a flowchart of FIG. 10.

When the encoding processing is started, the patch decomposition section 111 decomposes input 3D data into patches in Step S101, projects the 3D data onto two-dimensional planes per patch, and generates the geometry image, the texture image, and the occupancy map. In Step S102, the auxiliary patch information compression section 113 compresses the auxiliary patch information.

In Step S103, the packing section 112 packs each of the geometry image, the texture image, and the occupancy map obtained in Step S101.

In Step S104, the geometry video encoding section 114 encodes a geometry video frame that is the video frame of the geometry image obtained by packing the geometry image in Step S103 by any encoding method for two-dimensional images, for example, the AVC or the HEVC.

In Step S105, the texture video encoding section 115 encodes a color video frame that is the video frame of the texture image obtained by packing the texture image in Step S103 by any encoding method for two-dimensional images, for example, the AVC or the HEVC.

In Step S106, the OMap encoding section 116 encodes the occupancy map obtained by packing the occupancy map in Step S103 by any encoding method for two-dimensional images, for example, the AVC or the HEVC.

In Step S107, the multiplexer 117 multiplexes various data obtained in Steps S102, S104, S105, and S106 and generates the bit stream containing the various data.

In Step S108, the multiplexer 117 adds information associated with (frame-level) resolution of each of the geometry image and the texture image to the header of the bit stream. For example, as such information, the multiplexer 117 adds, to (the header of) the bit stream, the information indicating the correspondence relation in resolution between the geometry image and texture image, and the occupancy map.

In Step S109, the multiplexer 117 outputs the bit stream generated as described above (that is, bit stream containing the information associated with the resolution of each of the geometry image and the texture image) to outside of the encoding apparatus 100.

When processing in Step S109 is ended, the encoding processing is ended.

<Flow of Packing Processing>

Next, an example of a flow of packing processing executed in Step S103 of FIG. 10 will be described with reference to a flowchart of FIG. 11.

When the packing processing is started, the geometry packing section 121 packs the geometry image in Step S121.

In Step S122, the texture packing section 122 packs the texture image.

In Step S123, the OMap packing section 123 packs the occupancy map.

In Step S124, the geometry packing section 121 (or the texture packing section 122) generates the information associated with the frame-level resolution of the geometry image or the texture image. For example, the geometry packing section 121 (or the texture packing section 122) generates the information indicating the correspondence relation in resolution between the geometry image or the texture image and the occupancy map as such information. This information is contained in (signaled to) the bit stream as described above.

Figure 10:
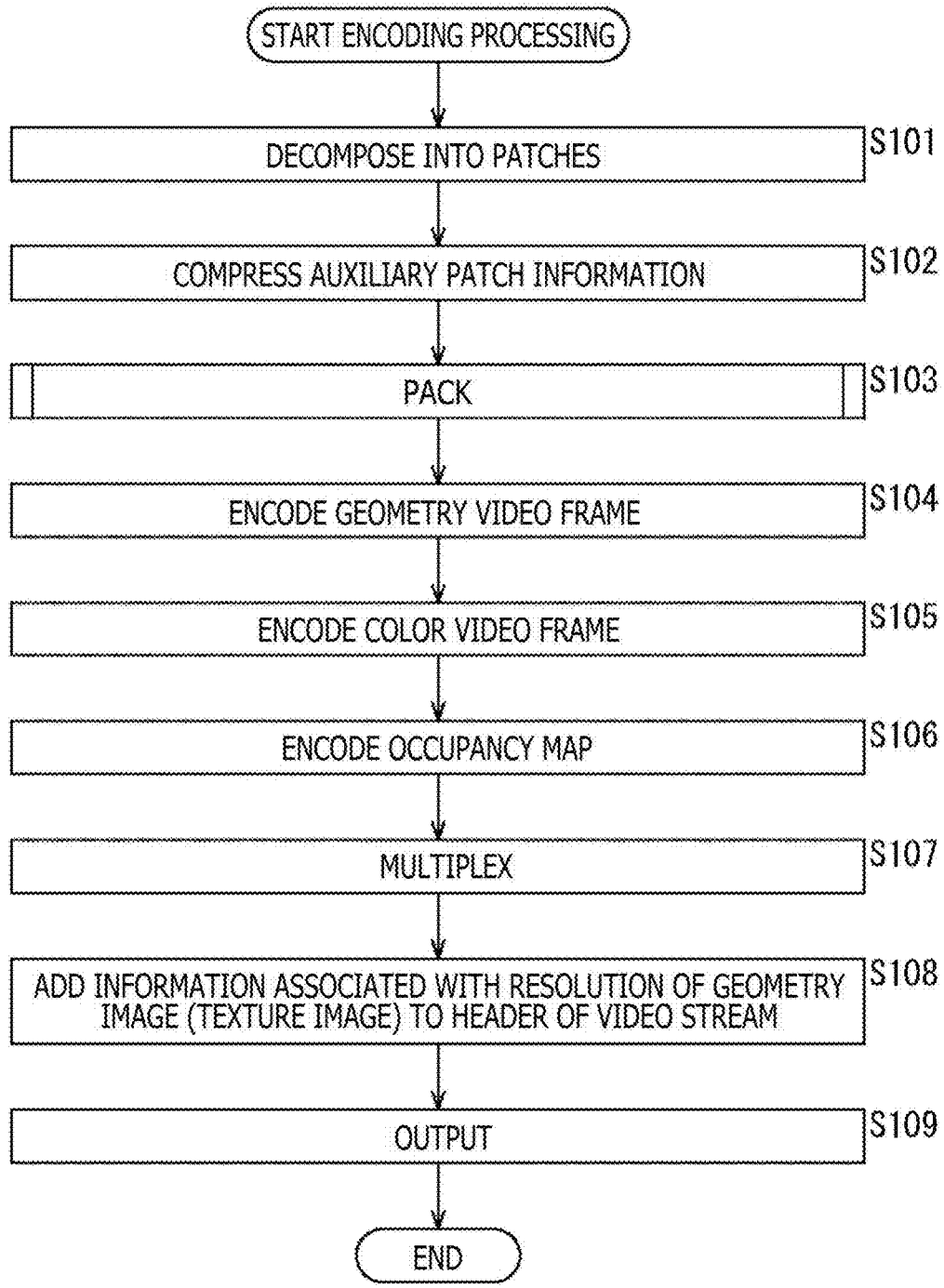
FIG. 10 is a flowchart illustrating an example of a flow of encoding processing.
Figure 11:
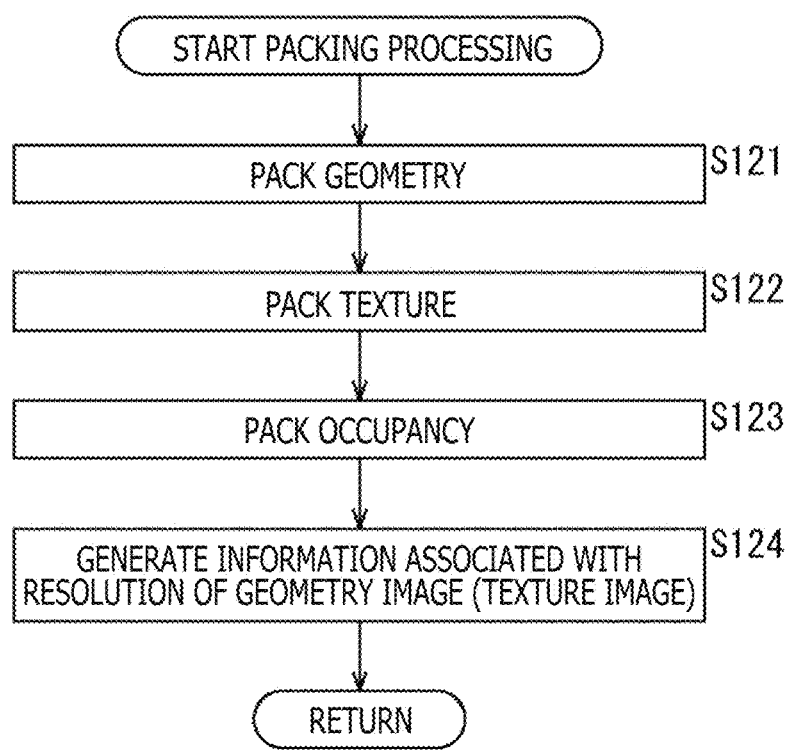
FIG. 11 is a flowchart illustrating an example of a flow of packing processing.

When processing in Step S124 is ended, the packing processing is ended, and the processing returns to FIG. 10.

By executing a series of processing described above, the encoding apparatus 100 can set the frame-level resolution of each of the geometry image and the texture image different from the resolution of the occupancy map. In addition, the encoding apparatus 100 can generate the bit stream containing the encoded data regarding each of such images and the information associated with the frame-level resolution of each of the geometry image and the texture image.

Therefore, it is possible to control the quality in response to types of pictures such as control to reduce the quality (resolution and the like) of P pictures and B pictures and to improve the quality (resolution and the like) of I pictures. It is, therefore, possible to suppress a reduction in encoding efficiency.

<Flow of Decoding Processing>

In the case of decoding the bit stream generated as described above, the unpacking section 216 in the decoding apparatus 200 changes the resolution of each of the geometry image and the texture image to be identical to the resolution of the occupancy map on the basis of the information contained in the bit stream and indicating the correspondence relation in resolution between the geometry image and texture image, and the occupancy map, and unpacks each of the video frame of the resolution-changed geometry image, the video frame of the resolution-changed texture image, and the occupancy map.

An example of a flow of decoding processing executed by the decoding apparatus 200 in this case will be described with reference to a flowchart of FIG. 12.

When the decoding processing is started, the demultiplexer 211 in the decoding apparatus 200 demultiplexes the input bit stream and extracts the encoded data regarding the auxiliary patch information, the encoded data regarding the video frame of the geometry image, the encoded data regarding the video frame of the texture image, the encoded data regarding the occupancy map, and the like from the bit stream in Step S141.

In Step S142, the auxiliary patch information decoding section 212 decodes the encoded data regarding the auxiliary patch information extracted in Step S141. In Step S143, the geometry video decoding section 213 decodes the encoded data regarding the geometry video frame extracted in Step S141.

In Step S144, the texture video decoding section 214 decodes the encoded data regarding the color video frame extracted in Step S141. In Step S145, the OMap decoding section 215 decodes the encoded data regarding the occupancy map extracted in Step S141.

In Step S146, the unpacking section 216 unpacks each of the geometry video frame obtained in Step S143, the color video frame obtained in Step S144, and the occupancy map obtained in Step S145.

In Step S147, the 3D reconstruction section 217 reconstructs the point cloud on the basis of various information obtained by unpacking each of the geometry video frame, the color video frame, and the occupancy map in Step S146.

When processing in Step S147 is ended, the decoding processing is ended.

<Flow of Unpacking Processing>

Figure 13:
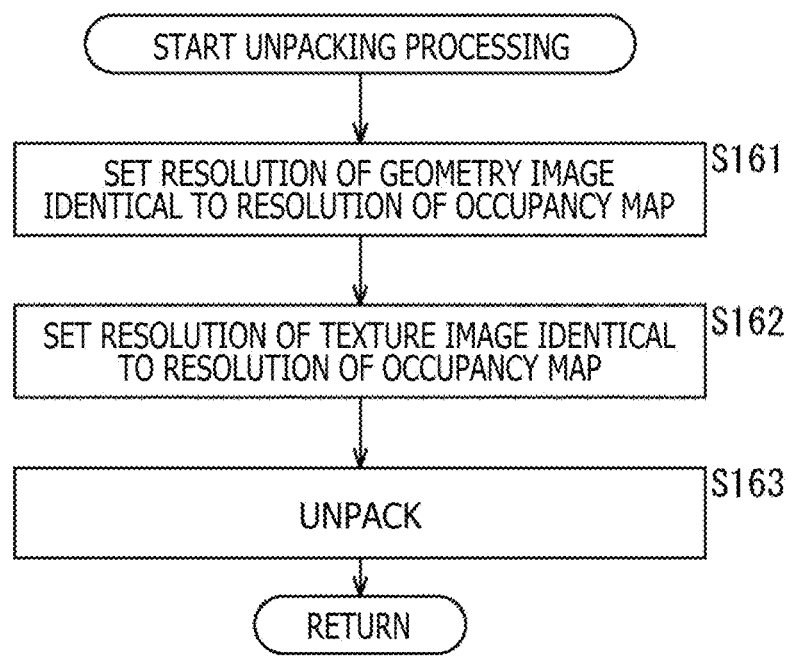
FIG. 13 is a flowchart illustrating an example of a flow of unpacking processing.

Next, an example of a flow of unpacking processing executed in Step S146 of FIG. 12 will be described with reference to a flowchart of FIG. 13.

When the unpacking processing is started, the geometry image processing section 222 performs image processing to make the resolution of the geometry image identical to the resolution of the occupancy map in Step S161.

In Step S162, the texture image processing section 223 performs image processing to make the resolution of the texture image identical to the resolution of the occupancy map.

In Step S163, the unpacking section 224 unpacks the geometry image (geometry video frame), the texture image (color video frame), and the occupancy map made to be identical in resolution (size) by the processing in Steps S161 and S162.

When processing in Step S163 is ended, the unpacking processing is ended, and the processing returns to FIG. 12.

By executing a series of processing described above, the unpacking section 216 can perform unpacking while making the geometry image, the texture image, and the occupancy map identical in resolution. Therefore, the unpacking section 224 can easily perform unpacking by a similar method to the conventional method.

Therefore, it is possible to control the quality in response to types of pictures such as control to reduce the quality (resolution and the like) of P pictures and B pictures and to improve the quality (resolution and the like) of I pictures. It is, therefore, possible to suppress a reduction in encoding efficiency.

3. Second Embodiment

<Individual Overall Resolutions>

Figure 14:
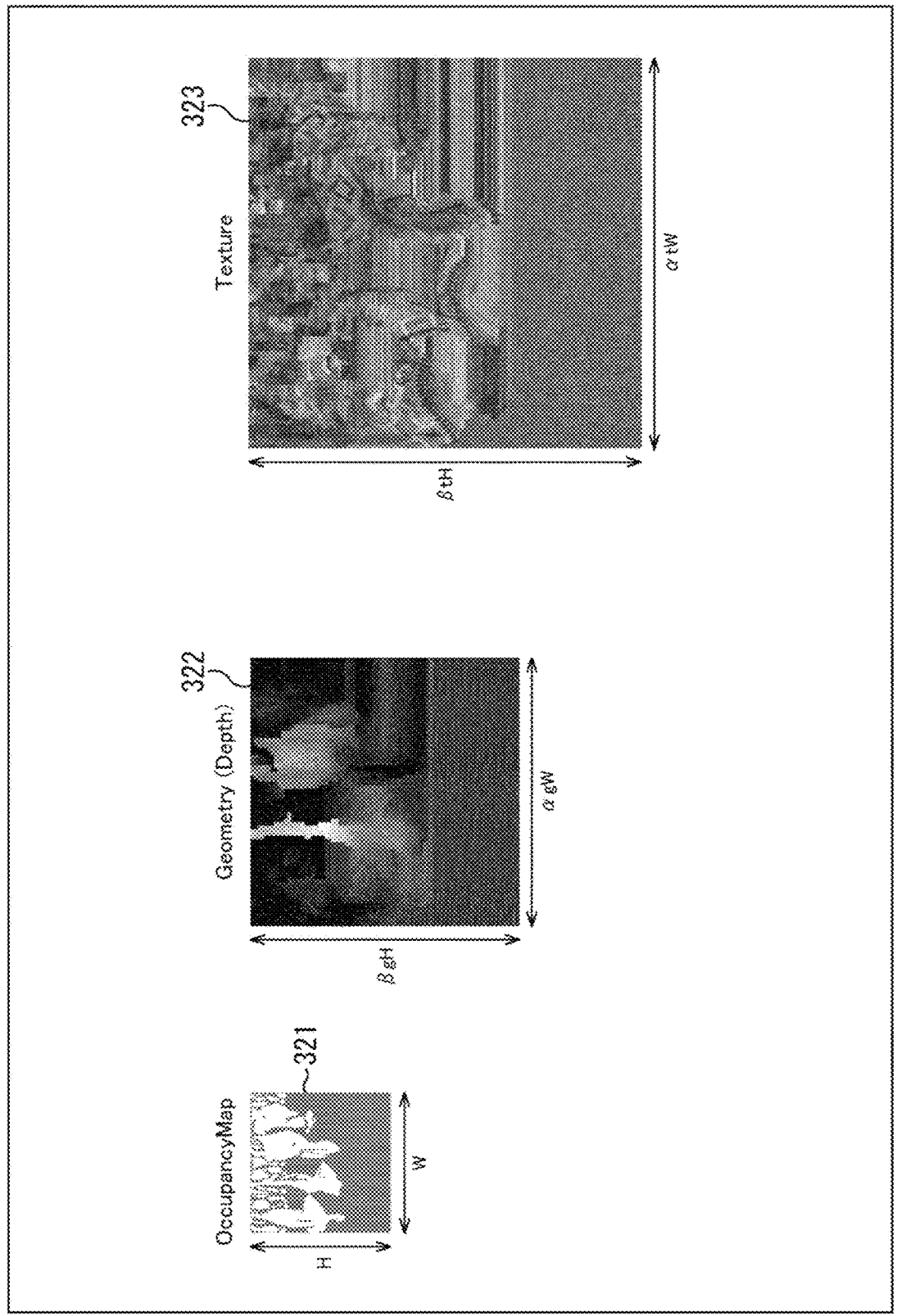
FIG. 14 is a diagram depicting an example of comparison of images.

The method 2 depicted in the table of FIG. 5 will be described. In this case, the frame-level resolution of each of the geometry image and the texture image differs from the resolution of the occupancy map. Furthermore, the resolution of the geometry image differs from the resolution of the texture image. For example, as depicted in FIG. 14, the size of an occupancy map 321 is $W*H$, the size of a geometry image 322 is $\alpha gW*\beta gH$, and the size of a texture image 323 is $\alpha tW*\beta tH$.

In such a case, the multiplexer 124 in the encoding apparatus 100 generates a bit stream containing information indicating the correspondence relation in resolution between the geometry image and the occupancy map, information indicating the correspondence relation in resolution between the texture image and the occupancy map, the encoded data regarding the geometry image, the encoded data regarding the texture image, and the encoded data regarding the occupancy map by performing multiplexing.

For example, the information indicating the correspondence relation in resolution between the geometry image and the occupancy map contains the variables $\alpha g$ and $\beta g$ described above. In addition, the information indicating the correspondence relation in resolution between the texture image and the occupancy map contains the variables $\alpha t$ and $\beta t$ described above. In other words, these variables $\alpha g$, $\beta g$, $\alpha t$, and $\beta t$ are, for example, signaled to the bit stream (stored in the bit stream and provided to the decoding side). Such information may be stored in, for example, a header of the bit stream.

<Flow of Encoding Processing>

An example of a flow of encoding processing executed by the encoding apparatus 100 in this case will be described with reference to a flowchart of FIG. 15.

When the encoding processing is started, the patch decomposition section 111 decomposes input 3D data into patches in Step S181, projects the 3D data onto two-dimensional planes per patch, and generates the geometry image, the texture image, and the occupancy map. In Step S182, the auxiliary patch information compression section 113 compresses the auxiliary patch information.

In Step S183, the packing section 112 packs each of the geometry image, the texture image, and the occupancy map obtained in Step S181.

In Step S184, the geometry video encoding section 114 encodes a geometry video frame that is the video frame of the geometry image obtained by packing the geometry image in Step S183 by any encoding method for two-dimensional images, for example, the AVC or the HEVC.

In Step S185, the texture video encoding section 115 encodes a color video frame that is the video frame of the texture image obtained by packing the texture image in Step S183 by any encoding method for two-dimensional images, for example, the AVC or the HEVC.

In Step S186, the OMap encoding section 116 encodes the occupancy map obtained by packing the occupancy map in Step S183 by any encoding method for two-dimensional images, for example, the AVC or the HEVC.

In Step S187, the multiplexer 117 multiplexes various data obtained in Steps S182, S184, S185, and S186 and generates the bit stream containing the various data.

In Step S188, the multiplexer 117 adds information associated with the (frame-level) resolution of the geometry image and information associated with the (frame-level) resolution of the texture image to the header of the bit stream. For example, as such information, the multiplexer 117 adds, to (the header of) the bit stream, the information indicating the correspondence relation in resolution between the geometry image and the occupancy map and the information indicating the correspondence relation in resolution between the texture image and the occupancy map.

In Step S189, the multiplexer 117 outputs the bit stream generated as described above (that is, bit stream containing the information associated with the resolution of the geometry image and the information associated with the resolution of the texture image) to outside of the encoding apparatus 100.

When processing in Step S189 is ended, the encoding processing is ended.

<Flow of Packing Processing>

Next, an example of a flow of packing processing executed in Step S183 of FIG. 15 will be described with reference to a flowchart of FIG. 16.

When the packing processing is started, the geometry packing section 121 packs the geometry image in Step S201.

In Step S202, the texture packing section 122 packs the texture image.

In Step S203, the OMap packing section 123 packs the occupancy map.

In Step S204, the geometry packing section 121 generates the information associated with the frame-level resolution of the geometry image. For example, the geometry packing section 121 generates the information indicating the correspondence relation in resolution between the geometry image and the occupancy map as such information. This information is contained in (signaled to) the bit stream as described above.

In Step S205, the texture packing section 122 generates the information associated with the frame-level resolution of the texture image. For example, the texture packing section 122 generates the information indicating the correspondence relation in resolution between the texture image and the occupancy map as such information. This information is contained in (signaled to) the bit stream as described above.

Figure 15:
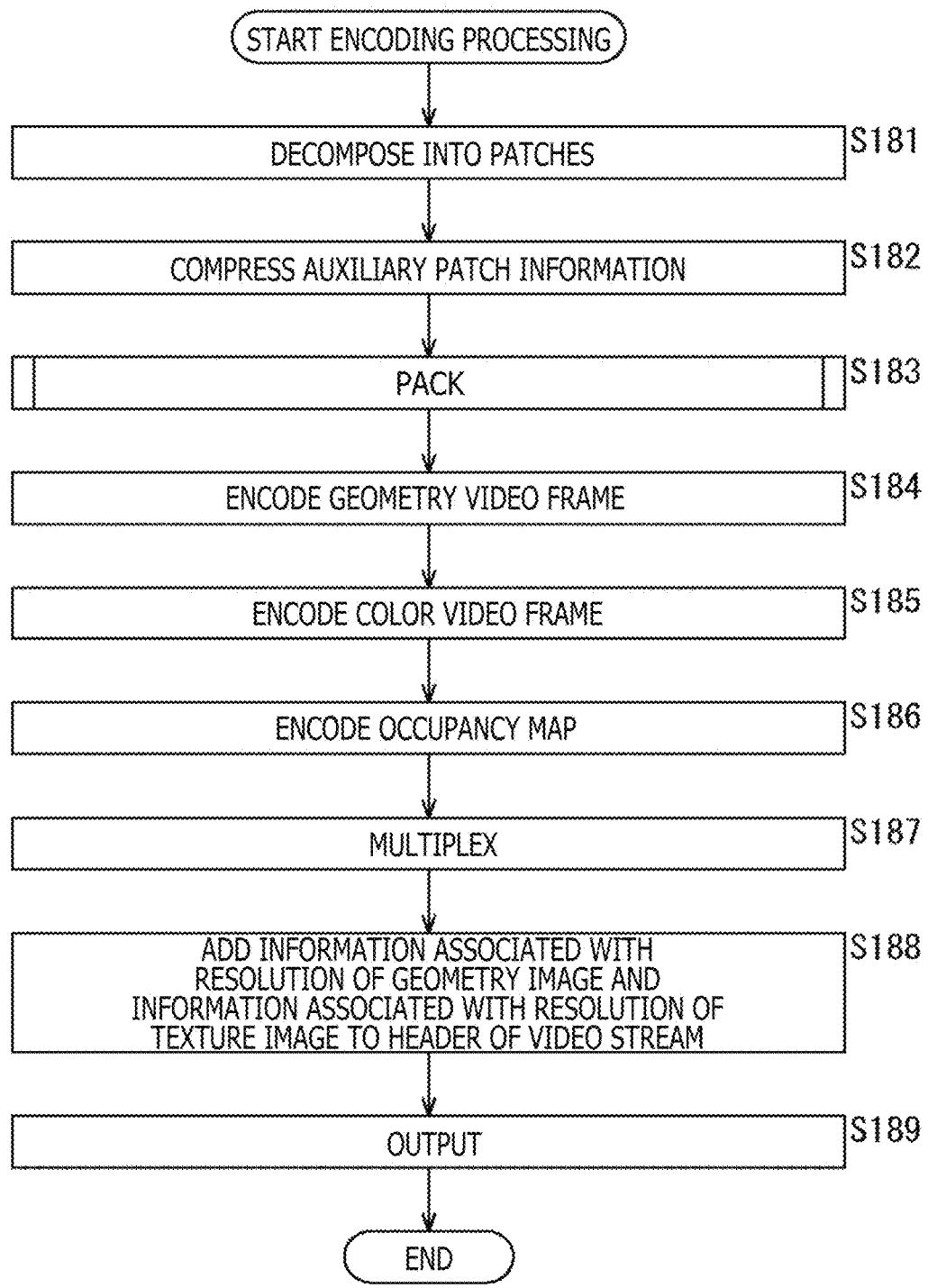
FIG. 15 is a flowchart illustrating an example of a flow of encoding processing.
Figure 16:
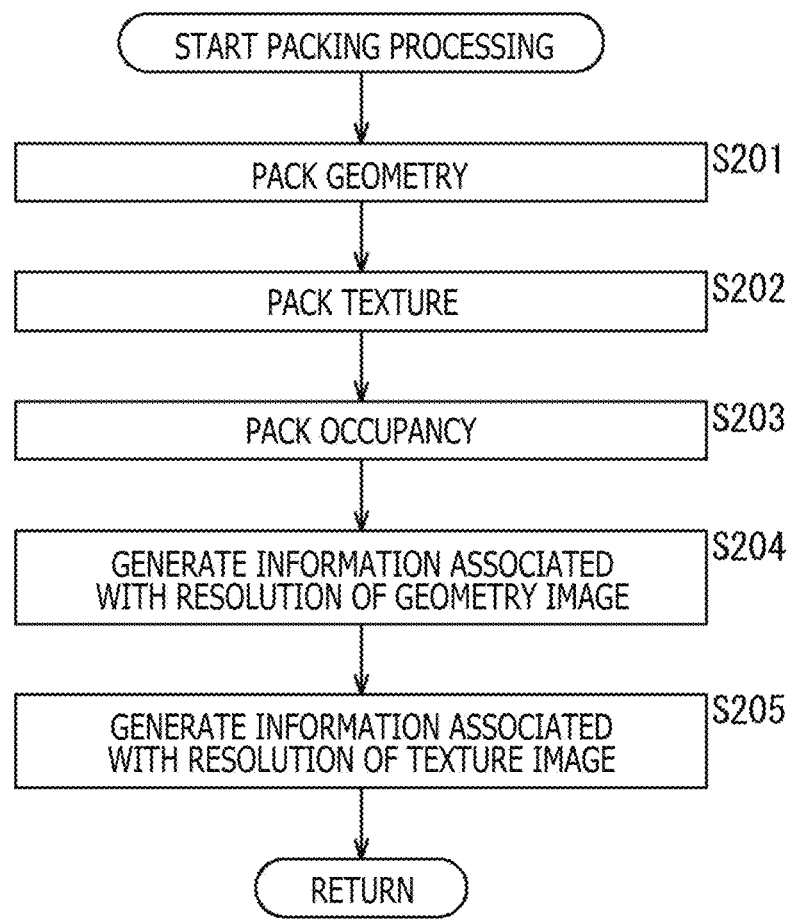
FIG. 16 is a flowchart illustrating an example of a flow of packing processing.

When processing in Step S205 is ended, the packing processing is ended, and the processing returns to FIG. 15.

By executing a series of processing described above, the encoding apparatus 100 can set the frame-level resolution of the geometry image different from the resolution of the occupancy map. In addition, the encoding apparatus 100 can set the frame-level resolution of the texture image different from the resolution of the occupancy map.

Furthermore, the encoding apparatus 100 can generate the bit stream containing the encoded data regarding each of such images, the information associated with the frame-level resolution of the geometry image, and the information associated with the frame-level resolution of the texture image.

It is, therefore, possible to handle 3D data different, for example, in resolution between the geometry image and the texture image. Furthermore, it is possible to perform encoding in light of an influence on a subjective image quality and, therefore, to suppress a reduction in encoding efficiency.

<Decoding Processing and Unpacking Processing>

In the case of decoding the bit stream generated as described above, the unpacking section 216 in the decoding apparatus 200 changes the resolution of the geometry image to be identical to the resolution of the occupancy map on the basis of the information contained in the bit stream and indicating the correspondence relation in resolution between the geometry image and the occupancy map, changes the resolution of the texture image to be identical to the resolution of the occupancy map on the basis of the information contained in the bit stream and indicating the correspondence relation in resolution between the texture image and the occupancy map, and unpacks each of the video frame of the resolution-changed geometry image, the video frame of the resolution-changed texture image, and the occupancy map.

It is noted that the decoding processing and the unpacking processing in this case can be performed similarly to the case of the first embodiment. Description of the decoding processing and the unpacking processing is, therefore, omitted.

By executing a series of processing described above, the unpacking section 216 can perform unpacking while making the geometry image, the texture image, and the occupancy map identical in resolution. Therefore, the unpacking section 224 can easily perform unpacking by a similar method to the conventional method.

It is, therefore, possible to handle 3D data different, for example, in resolution between the geometry image and the texture image. Furthermore, it is possible to perform encoding in light of an influence on a subjective image quality and, therefore, to suppress a reduction in encoding efficiency.

4. Third Embodiment

<Common Patch Position and Resolution>

The method 3 depicted in the table of FIG. 5 will be described. In this case, a per-patch position and a per-patch resolution of each of the geometry image and the texture image differ from a per-patch position and a per-patch resolution of the occupancy map. It is noted that the per-patch position and the per-patch resolution are identical between the geometry image and the texture image.

Figure 17:
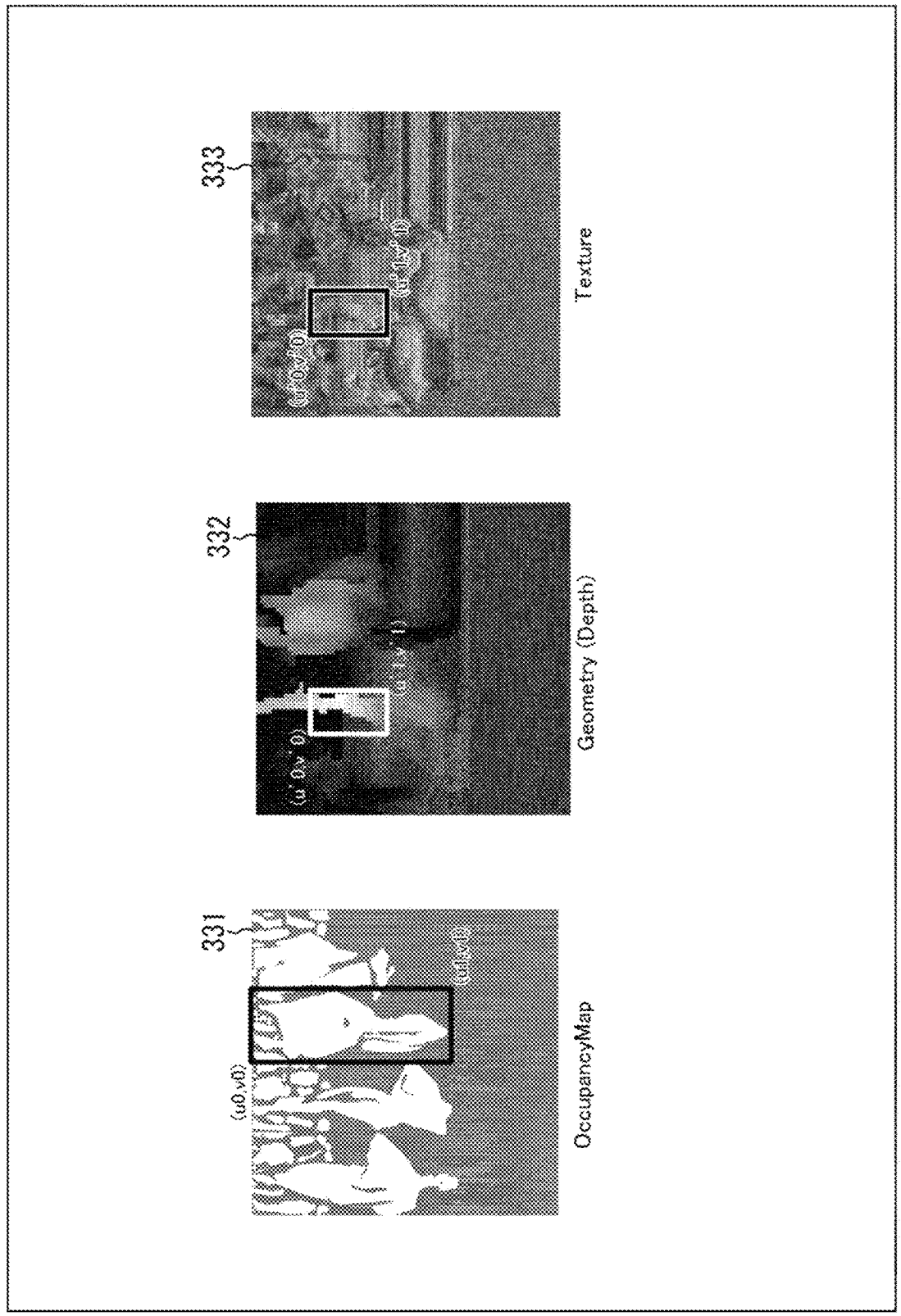
FIG. 17 is a diagram depicting an example of comparison of images.

As depicted in, for example, FIG. 17, coordinates of opposite vertices of a predetermined patch range on an occupancy map 331 are (u0,v0) and (u1,v1), and coordinates of opposite vertices of the patch range on each of a geometry image 332 and a texture image 333 are (u'0,v'0) and (u'1, v'1).

In such a case, the multiplexer 124 in the encoding apparatus 100 generates a bit stream containing the information indicating the correspondence relation in per-patch position and per-patch resolution between each of the geometry image and texture image and the occupancy map, and the encoded data regarding the geometry image, the encoded data regarding the texture image, and the encoded data regarding the occupancy map by performing multiplexing.

For example, this information indicating the correspondence relation in per-patch position and per-patch resolution may contain coordinates of opposite vertices of a rectangular area of the patch. This information indicating the correspondence relation in per-patch position and per-patch resolution may contain, for example, u'0,v'0, u'1,v'1, and the like described above. In other words, these coordinates u'0,v'0 and u'1,v'1 are, for example, signaled to the bit stream (stored in the bit stream and provided to the decoding side). Such information may be added, for example, to information regarding each patch on the occupancy map.

<Flow of Encoding Processing>

An example of a flow of encoding processing executed by the encoding apparatus 100 in this case will be described with reference to a flowchart of FIG. 18.

When the encoding processing is started, the patch decomposition section 111 decomposes input 3D data into patches in Step S221, projects the 3D data onto two-dimensional planes per patch, and generates the geometry image, the texture image, and the occupancy map. In Step S222, the auxiliary patch information compression section 113 compresses the auxiliary patch information.

In Step S223, the packing section 112 packs each of the geometry image, the texture image, and the occupancy map obtained in Step S221.

In Step S224, the geometry video encoding section 114 encodes a geometry video frame that is the video frame of the geometry image obtained by packing the geometry image in Step S223 by any encoding method for two-dimensional images, for example, the AVC or the HEVC.

In Step S225, the texture video encoding section 115 encodes a color video frame that is the video frame of the texture image obtained by packing the texture image in Step S223 by any encoding method for two-dimensional images, for example, the AVC or the HEVC.

In Step S226, the OMap encoding section 116 encodes the occupancy map obtained by packing the occupancy map in Step S223 by any encoding method for two-dimensional images, for example, the AVC or the HEVC.

In Step S227, the multiplexer 117 multiplexes various data obtained in Steps S222, S224, S225, and S226 and generates the bit stream containing the various data.

In Step S228, the multiplexer 117 outputs the bit stream generated as described above (that is, bit stream containing the information associated with the resolution of each of the geometry image and the texture image) to outside of the encoding apparatus 100.

When processing in Step S228 is ended, the encoding processing is ended.

<Flow of Packing Processing>

Next, an example of a flow of packing processing executed in Step S223 of FIG. 18 will be described with reference to a flowchart of FIG. 19.

When the packing processing is started, the geometry packing section 121 packs the geometry image in Step S241.

In Step S242, the texture packing section 122 packs the texture image.

In Step S243, the OMap packing section 123 packs the occupancy map.

In Step S244, the multiplexer 124 adds information associated with coordinates of each patch on the geometry image (texture image) to the occupancy map, and makes the coordinates of each patch on the geometry image (texture image) correspond to the coordinates on the occupancy map. This information is contained in (signaled to) the bit stream as described above.

Figure 18:
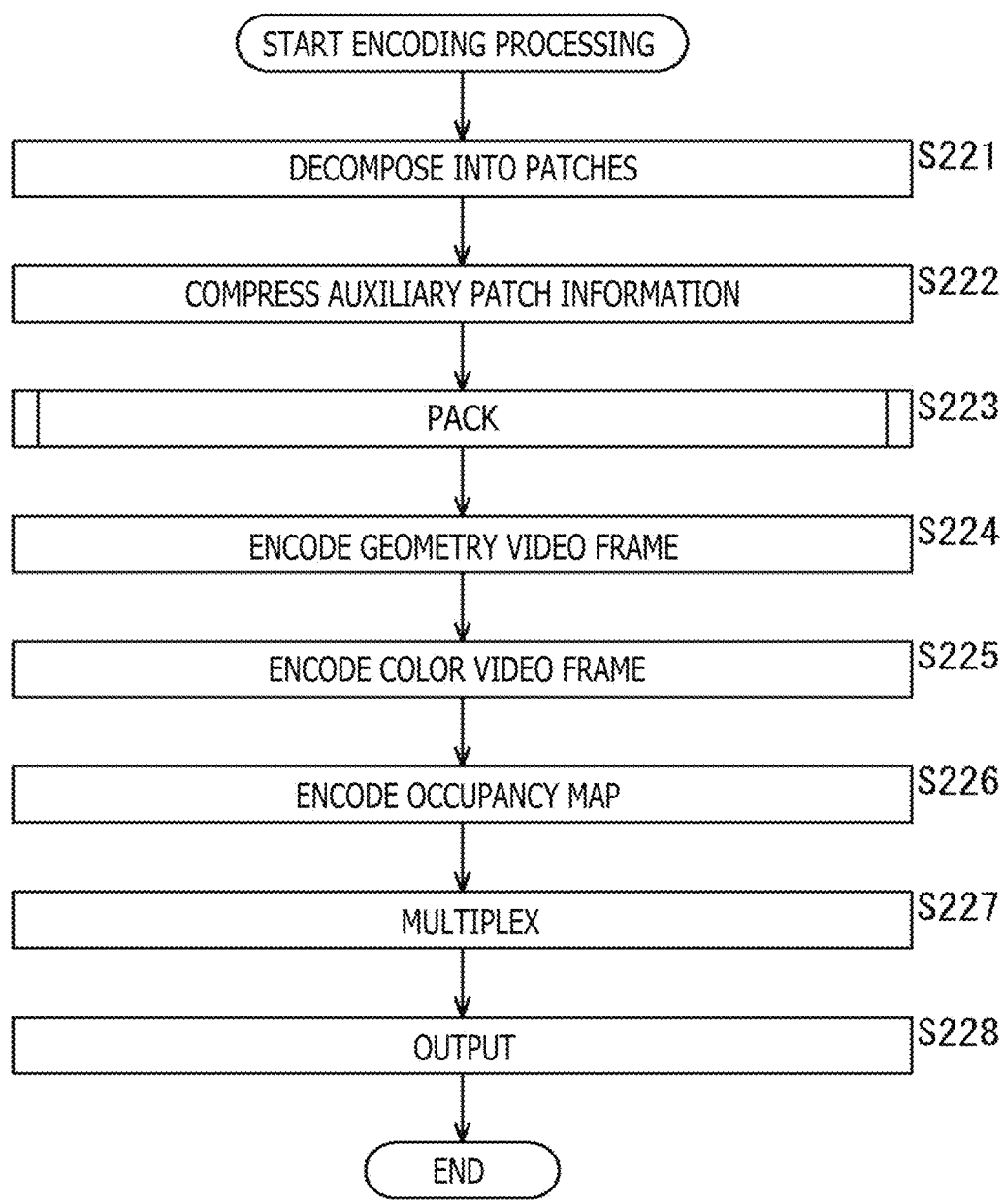
FIG. 18 is a flowchart illustrating an example of a flow of encoding processing.
Figure 19:
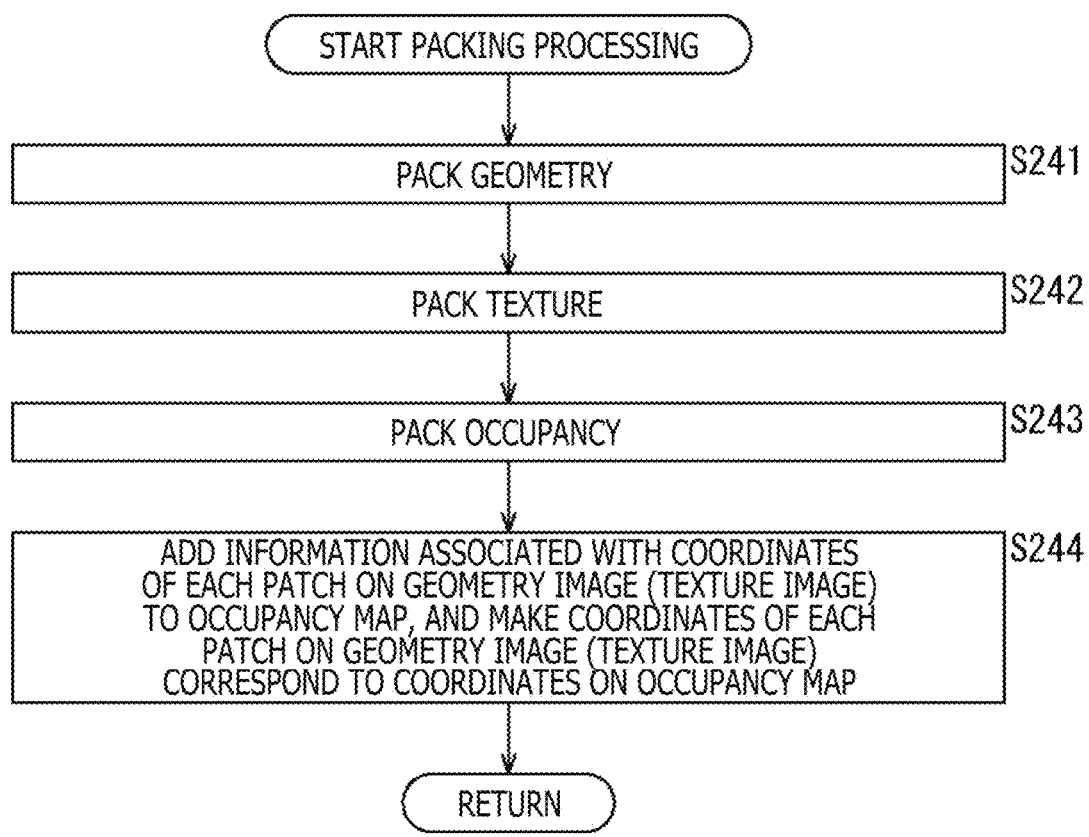
FIG. 19 is a flowchart illustrating an example of a flow of packing processing.

When processing in Step S244 is ended, the packing processing is ended, and the processing returns to FIG. 18.

By executing a series of processing described above, the encoding apparatus 100 can set the per-patch position and the per-patch resolution of each of the geometry image and the texture image different from the per-patch position and the per-patch resolution of each patch on the occupancy map. In addition, the encoding apparatus 100 can generate the bit stream containing the encoded data regarding each of such images and the information indicating the correspondence relation in per-patch position and per-patch resolution between each of the geometry image and texture image and the occupancy map.

Therefore, it is possible to, for example, make adjustment of an image quality (resolution) per area. It is, therefore, possible to improve encoding efficiency of subsequent video codec.

<Flow of Decoding Processing>

In the case of decoding the bit stream generated as described above, the unpacking section 216 in the decoding apparatus 200 changes the per-patch position and the per-patch resolution of each of the geometry image and the texture image to be identical to the per-patch position and the per-patch resolution of the occupancy map on the basis of the information contained in the bit stream and indicating the correspondence relation in per-patch position and per-patch resolution, and unpacks each of the video frame of the geometry image after changing the per-patch position and the per-patch resolution, the video frame of the texture image after changing the per-patch position and the per-patch resolution, and the occupancy map.

It is noted that the decoding processing in this case can be performed similarly to the case of the first embodiment. Description of the decoding processing is, therefore, omitted.

<Flow of Unpacking Processing>

Figure 20:
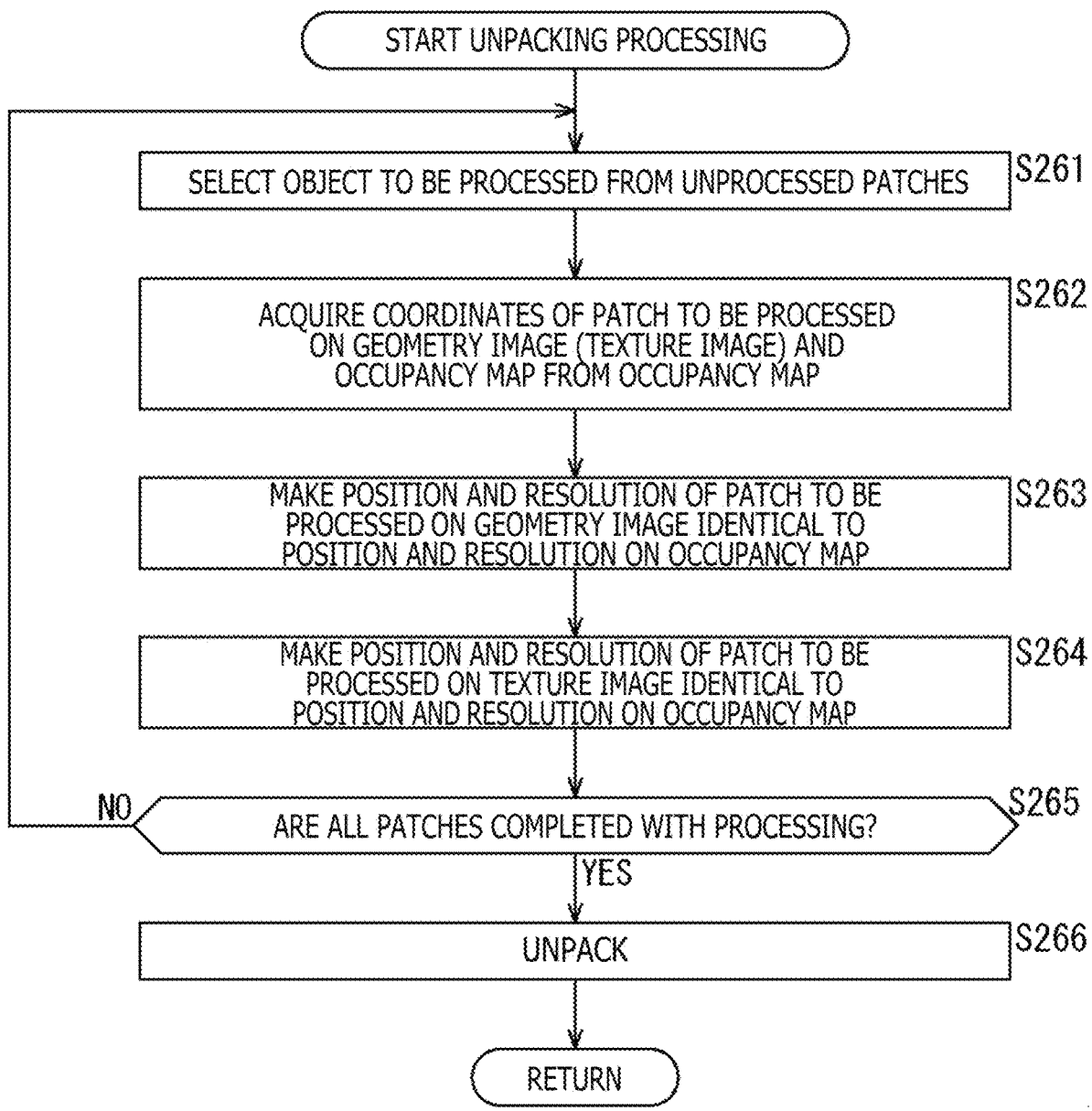
FIG. 20 is a flowchart illustrating an example of a flow of unpacking processing.

Next, an example of a flow of unpacking processing executed in Step S146 of FIG. 12 will be described with reference to a flowchart of FIG. 20.

When the unpacking processing is started, the geometry image processing section 222 (or texture image processing section 223) selects a patch to be processed from among unprocessed patches in Step S261.

In Step S262, the geometry image processing section 222 (or texture image processing section 223) acquires coordinates of the patch to be processed on the geometry image (or texture image) and the occupancy map from the occupancy map.

In Step S263, the geometry image processing section 222 performs image processing on the geometry video frame to make the position and the resolution of the patch to be processed on the geometry image identical to the position and the resolution of the patch to be processed on the occupancy map.

In Step S264, the texture image processing section 223 performs image processing on the color video frame to make the position and the resolution of the patch to be processed on the texture image identical to the position and the resolution of the patch to be processed on the occupancy map.

In Step S265, the geometry image processing section 222 (or the texture image processing section 223) determines whether or not all patches are completed with processing. In a case in which it is determined that an unprocessed patch is present (Step S265: No), the processing returns to Step S261 and a subsequent series of processing is repeated for the new unprocessed patch.

Furthermore, in a case in which it is determined in Step S265 that all patches are completed with processing (Step S265: Yes), the processing goes to Step S266. In other words, the positions and the resolutions of all patches on the geometry image (and the texture image) are coincident with the positions and the resolutions on the occupancy map in this state.

In Step S266, the unpacking section 224 unpacks the geometry image (geometry video frame), the texture image (color video frame), and the occupancy map.

When processing in Step S266 is ended, the unpacking processing is ended, and the processing returns to FIG. 12.

By executing a series of processing described above, the unpacking section 216 can perform unpacking while making all patches on the geometry image, the texture image, and the occupancy map identical in position and resolution. Therefore, the unpacking section 224 can easily perform unpacking by a similar method to the conventional method.

Therefore, it is possible to, for example, make adjustment of an image quality (resolution) per area. It is, therefore, possible to improve encoding efficiency of subsequent video codec.

5. Fourth Embodiment

<Individual Patch Positions and Resolutions>

The method 4 depicted in the table of FIG. 5 will be described. In this case, a per-patch position and a per-patch resolution of each of the geometry image and the texture image differ from a per-patch position and a per-patch resolution of the occupancy map. Furthermore, the per-patch position and the per-patch resolution of the geometry image differ from the per-patch position and the per-patch resolution of the texture image.

Figure 21:
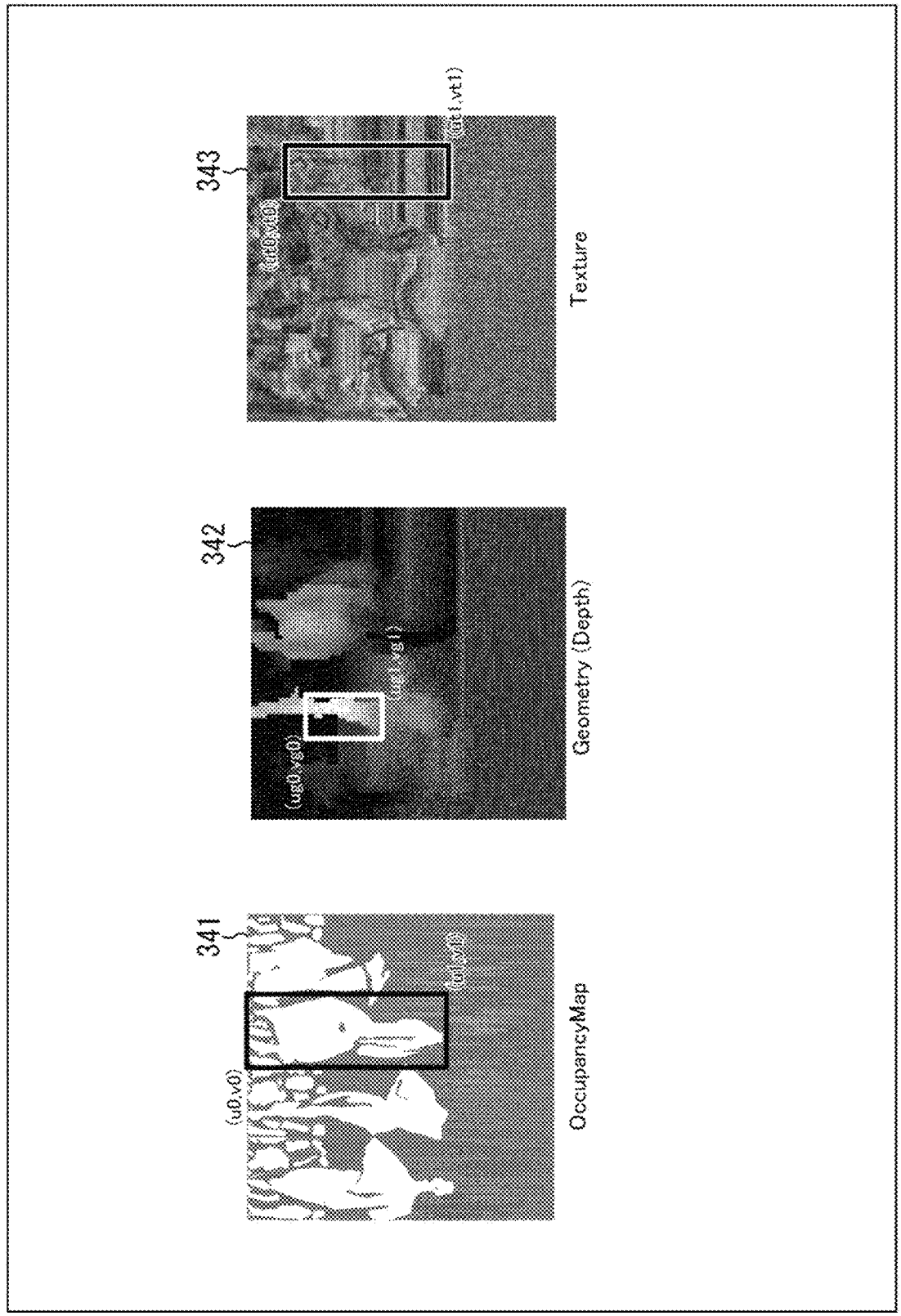
FIG. 21 is a diagram depicting an example of comparison of images.

For example, as depicted in FIG. 21, coordinates of opposite vertices of a predetermined patch range on an occupancy map 341 are (u0,v0) and (u1,v1), coordinates of opposite vertices of the patch range on a geometry image 342 are (ug0,vg0) and (ug1,vg1), and coordinates of opposite vertices of the patch range on a texture image 343 are (ut0,vt0) and (ut1,vt1).

In such a case, the multiplexer 124 in the encoding apparatus 100 generates a bit stream containing information indicating a correspondence relation in per-patch position and per-patch resolution between the geometry image and the occupancy map, information indicating a correspondence relation in per-patch position and per-patch resolution between the texture image and the occupancy map, the encoded data regarding the geometry image, the encoded data regarding the texture image, and the encoded data regarding the occupancy map by performing multiplexing.

For example, the information indicating the correspondence relation in per-patch position and per-patch resolution between the geometry image and the occupancy map contains the coordinates (ug0,vg0) and (ug1,vg1) described above. Furthermore, the information indicating the correspondence relation in per-patch position and per-patch resolution between the texture image and the occupancy map may contain the coordinates (ut0,vt0) and (ut1,vt1) described above. In other words, these coordinates (ug0, vg0), (ug1,vg1), (ut0,vt0), and (ut1,vt1) may be signaled to the bit stream (stored in the bit stream and provided to the decoding side). Such information may be added, for example, to information regarding each patch on the occupancy map.

<Flow of Encoding Processing>

The encoding processing executed by the encoding apparatus 100 in this case can be performed similarly to the case of the third embodiment (FIG. 18). Description of the encoding processing is, therefore, omitted.

<Flow of Packing Processing>

Figure 22:
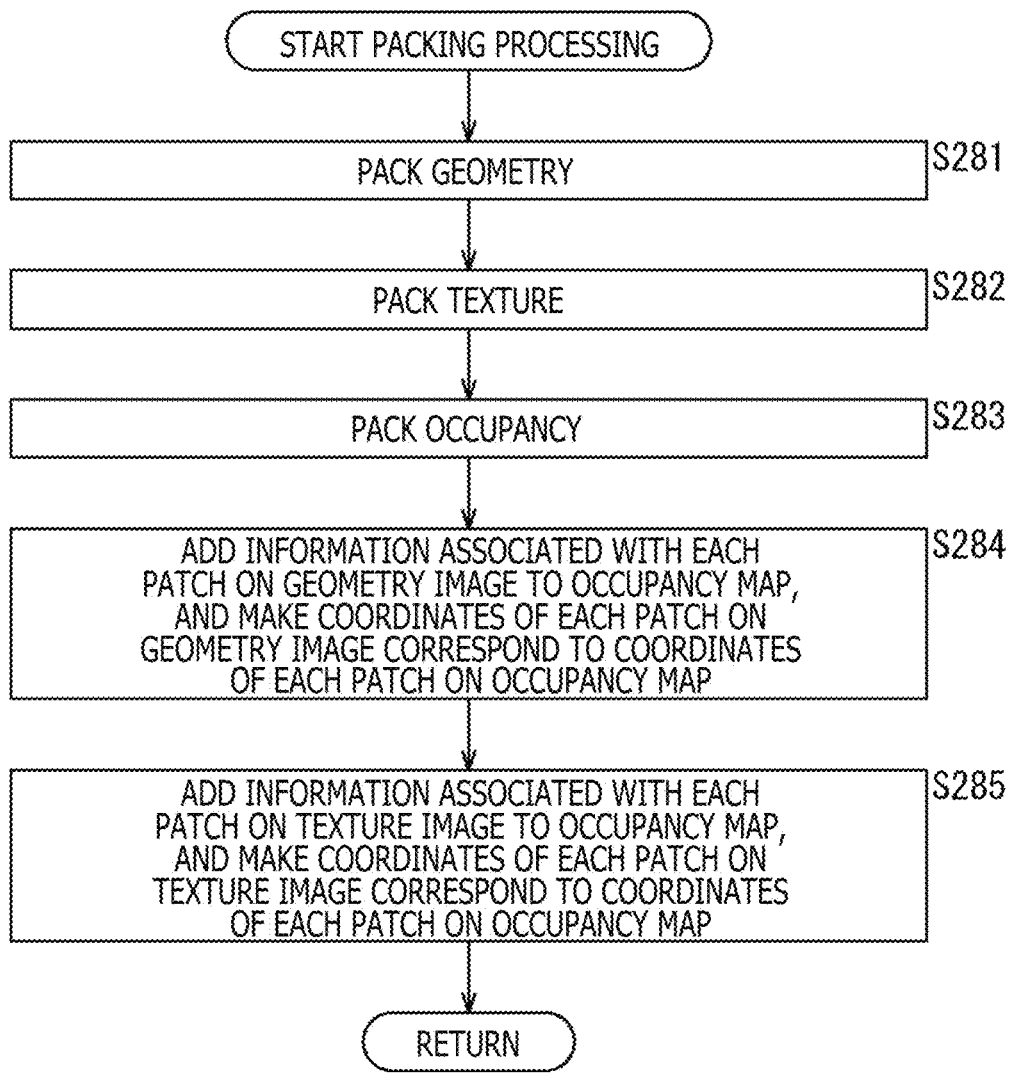
FIG. 22 is a flowchart illustrating an example of a flow of packing processing.

Next, an example of a flow of packing processing executed in Step S223 of FIG. 18 in this case will be described with reference to a flowchart of FIG. 22.

When the packing processing is started, the geometry packing section 121 packs the geometry image in Step S281.

In Step S282, the texture packing section 122 packs the texture image.

In Step S283, the OMap packing section 123 packs the occupancy map.

In Step S284, the multiplexer 124 adds information associated with coordinates of each patch on the geometry image to the occupancy map, and makes the coordinates of each patch on the geometry image correspond to the coordinates on the occupancy map. This information is contained in (signaled to) the bit stream as described above.

In Step S285, the multiplexer 124 adds information associated with coordinates of each patch on the texture image to the occupancy map, and makes the coordinates of each patch on the texture image correspond to the coordinates on the occupancy map. This information is contained in (signaled to) the bit stream as described above.

When processing in Step S285 is ended, the packing processing is ended, and the processing returns to FIG. 18.

By executing a series of processing described above, the encoding apparatus 100 can set the per-patch position and the per-patch resolution of the geometry image different from the per-patch position and the per-patch resolution of the occupancy map. In addition, the encoding apparatus 100 can set the per-patch position and the per-patch resolution of the texture image different from the per-patch position and the per-patch resolution of the occupancy map.

Furthermore, the encoding apparatus 100 can generate the bit stream containing the encoded data regarding each of such images, the information indicating the correspondence relation in per-patch position and per-patch resolution between the geometry image and the occupancy map, and the information indicating the correspondence relation in per-patch position and per-patch resolution between the texture image and the occupancy map.

Therefore, it is possible to, for example, make adjustment of an image quality (resolution) per area. It is, therefore, possible to improve encoding efficiency of subsequent video codec. It is also possible to handle 3D data different in resolution between the geometry image and the texture image. Furthermore, it is possible to perform encoding in light of an influence on a subjective image quality and, therefore, to suppress a reduction in encoding efficiency.

<Flow of Decoding Processing>

In the case of decoding the bit stream generated as described above, the unpacking section 216 in the decoding apparatus 200 changes the per-patch position and the per-patch resolution of the geometry image to be identical to the per-patch position and the per-patch resolution of the occupancy map on the basis of the information contained in the bit stream and indicating the correspondence relation in per-patch position and per-patch resolution between the geometry image and the occupancy map, changes the per-patch position and the per-patch resolution of the texture image to be identical to the per-patch position and the per-patch resolution of the occupancy map on the basis of the information contained in the bit stream and indicating the correspondence relation in per-patch position and per-patch resolution between the texture image and the occupancy map, and unpacks each of the video frame of the geometry image after changing the per-patch position and the per-patch resolution, the video frame of the texture image after changing the per-patch position and the per-patch resolution, and the occupancy map.

It is noted that the decoding processing in this case can be performed similarly to the case of the first embodiment. Description of the decoding processing is, therefore, omitted.

<Flow of Unpacking Processing>

Figure 23:
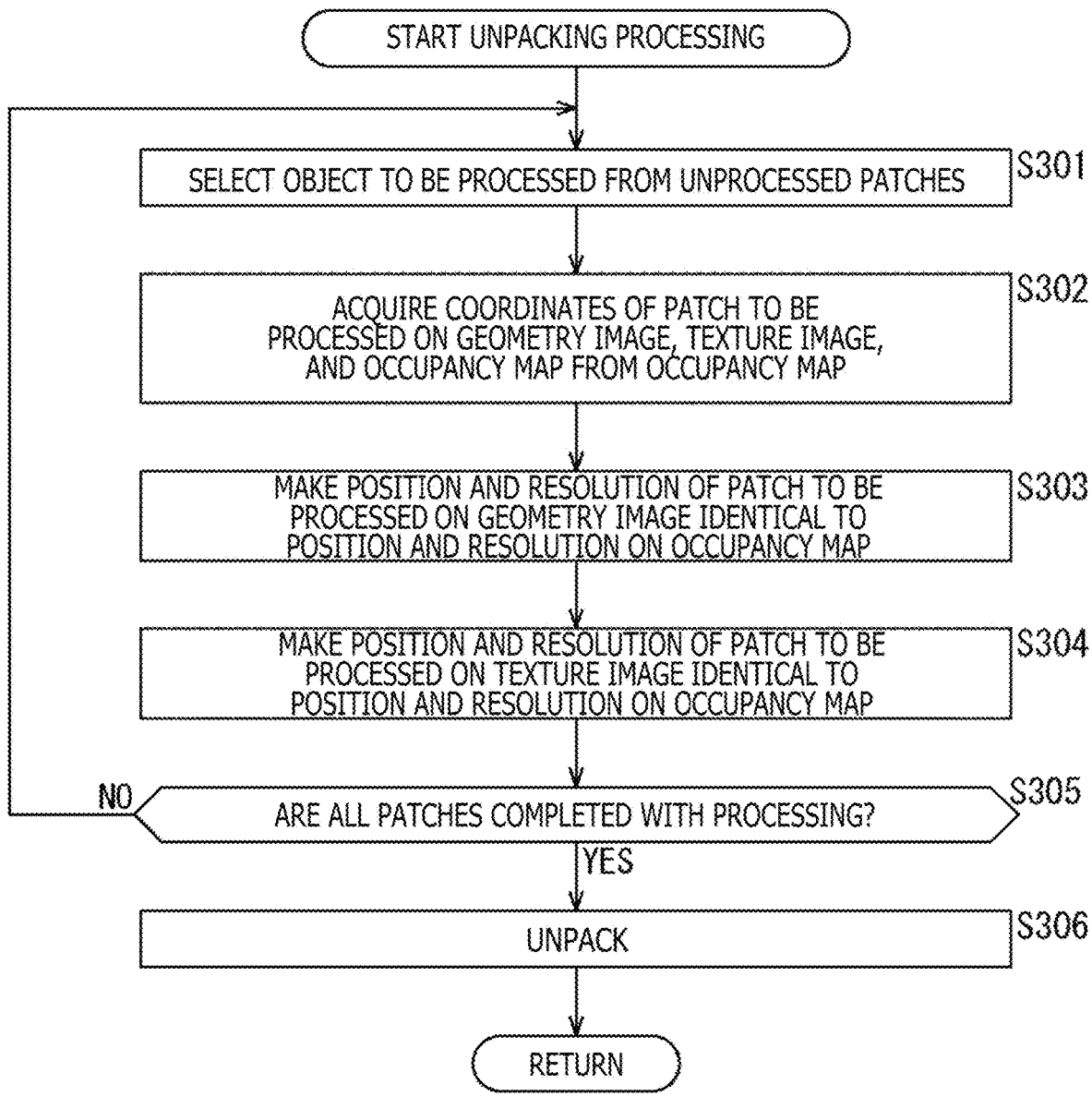
FIG. 23 is a flowchart illustrating an example of a flow of unpacking processing.

Next, an example of a flow of unpacking processing executed in Step S146 of FIG. 12 will be described with reference to a flowchart of FIG. 23.

When the unpacking processing is started, the geometry image processing section 222 (or texture image processing section 223) selects a patch to be processed from among unprocessed patches in Step S301.

In Step S302, the geometry image processing section 222 (or texture image processing section 223) acquires coordinates of the patch to be processed on the geometry image or texture image and the occupancy map from the occupancy map.

In Step S303, the geometry image processing section 222 performs image processing on the geometry video frame to make the position and the resolution of the patch to be processed on the geometry image identical to the position and the resolution of the patch to be processed on the occupancy map.

In Step S304, the texture image processing section 223 performs image processing on the color video frame to make the position and the resolution of the patch to be processed on the texture image identical to the position and the resolution of the patch to be processed on the occupancy map.

In Step S305, the geometry image processing section 222 (or texture image processing section 223) determines whether or not all patches are completed with processing. In a case in which it is determined that an unprocessed patch is present (Step S305: NO), the processing returns to Step S301 and a subsequent series of processing is repeated for the new unprocessed patch.

Furthermore, in a case in which it is determined in Step S305 that all patches are completed with processing (Step S305: YES), the processing goes to Step S306. In other words, the positions and the resolutions of all patches on the geometry image and the texture image are coincident with the positions and the resolutions on the occupancy map in this state.

In Step S306, the unpacking section 224 unpacks the geometry image (geometry video frame), the texture image (color video frame), and the occupancy map.

When processing in Step S306 is ended, the unpacking processing is ended, and the processing returns to FIG. 12.

By executing a series of processing described above, the unpacking section 216 can perform unpacking while making all patches on the geometry image, the texture image, and the occupancy map identical in position and resolution. Therefore, the unpacking section 224 can easily perform unpacking by a similar method to the conventional method.

Therefore, it is possible to, for example, make adjustment of an image quality (resolution) per area. It is, therefore, possible to improve encoding efficiency of subsequent video codec. It is also possible to handle 3D data different in resolution between the geometry image and the texture image. Furthermore, it is possible to perform encoding in light of an influence on a subjective image quality and, therefore, to suppress a reduction in encoding efficiency.

6. Fifth Embodiment

<Unpacking and 3D Reconstruction>

The method 5 depicted in the table of FIG. 5 will be described. In this case, 3D data is reconstructed by performing unpacking without making adjustment of images (conversion of the positions and the resolutions) of the geometry image and the texture image. In this case, however, the table information indicating the per-pixel correspondence relations between the occupancy map and the geometry image and between the occupancy map and the texture image, for example, is added to the occupancy map, and it is possible for the decoding side to make positions of these images correspond to one another at a pixel level on the basis of the table information.

Description will be made while taking the method 3 described above by way of example. As depicted in, for example, FIG. 24, it is assumed that coordinates of opposite vertices of a predetermined patch range on an occupancy map 361 are (u0,v0) and (u1,v1), and coordinates of opposite vertices of the patch range on a texture image 362 are (u'0,v'0) and (u'1,v'1). In this case, a position and a resolution of this patch on the texture image 362 are updated in such a manner that the position and the resolution of this patch on the texture image 362 are identical to the position and the resolution on the occupancy map 361 as in a texture 363.

In this case, therefore, it is possible to correctly perform unpacking similarly to the conventional technology but image processing for updating the position and the resolution described above is necessary.

Figure 24:
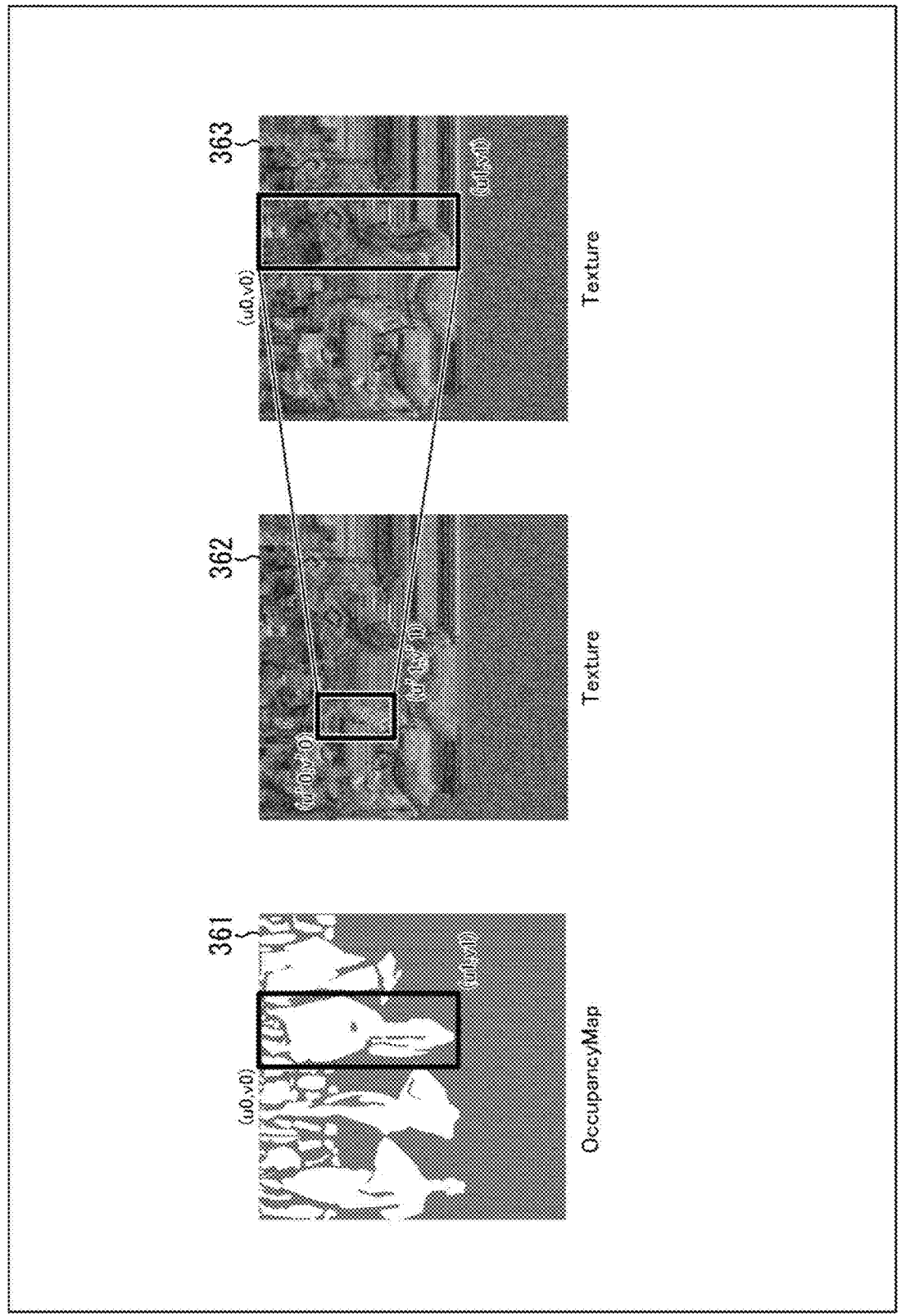
FIG. 24 is a diagram depicting an example of states of image processing.
Figure 25:
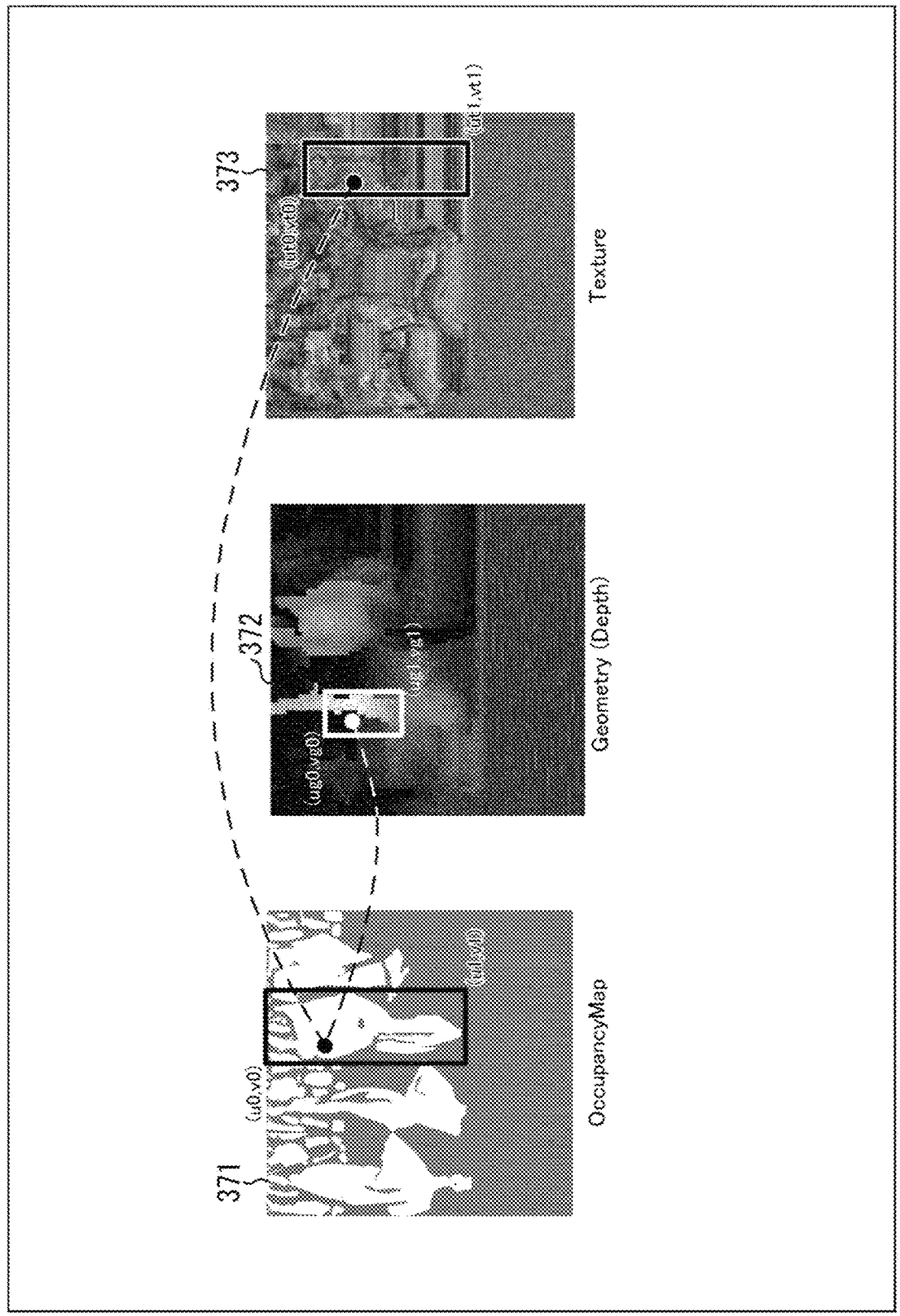
FIG. 25 is a diagram depicting an example of a correspondence relation in coordinates among images.

By contrast, if a per-pixel correspondence relation is held among the images as in an occupancy map 371, a geometry image 372, and a texture image 373 of FIG. 25, it is possible to reconstruct 3D data by performing unpacking without performing the image processing depicted in FIG. 24.

In other words, in this case, the encoding apparatus 100 generates the table information regarding the per-pixel correspondence relations between the occupancy map and the geometry image and between the occupancy map and the texture image, and adds the table information to the bit stream (occupancy map, for example). In addition, the decoding apparatus 200 performs unpacking and 3D reconstruction on the basis of the table information without performing the image processing for updating the positions and the resolutions of the geometry image and the texture image.

The encoding apparatus 100 can perform such processing by similar configurations to those described with reference to FIG. 7.

<Decoding Apparatus>

Figure 26:
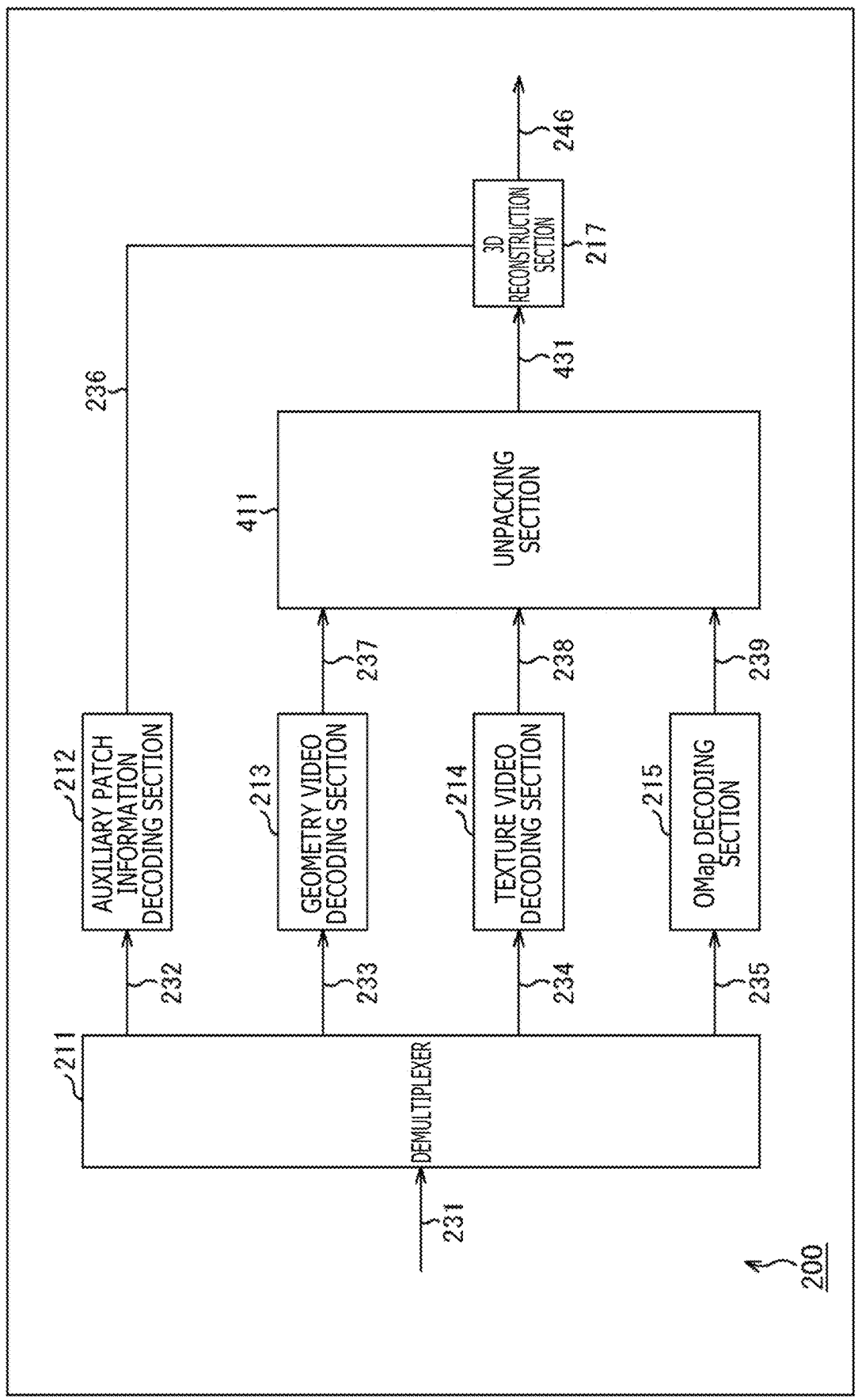
FIG. 26 is a block diagram depicting an example of principal configurations of the decoding apparatus.

FIG. 26 is a block diagram depicting an example of principal configurations of the decoding apparatus 200 in this case. Similarly to the case of FIG. 8, the decoding apparatus 200 in this case is an apparatus that decodes encoded data obtained by projecting 3D data such as the point cloud onto two-dimensional planes and encoding the projected data by the decoding method for two-dimensional images and that projects the decoded data onto a three-dimensional space.

As depicted in FIG. 26, the decoding apparatus 200 in this case is basically similar in configuration to the case depicted in FIG. 8 except that the decoding apparatus 200 has an unpacking section 411 as an alternative to the unpacking section 216.

The unpacking section 411 is a processing section similar to the unpacking section 224 and performs processing associated with unpacking. For example, the unpacking section 411 acquires the geometry video frame supplied from the geometry video decoding section 213 (arrow 237). Furthermore, the unpacking section 411 acquires the color video frame supplied from the texture video decoding section 214 (arrow 238). Moreover, the unpacking section 411 acquires the occupancy map supplied from the OMap decoding section 215 (arrow 239).

The unpacking section 411 unpacks each of those video frames. In other words, the unpacking section 411 unpacks the geometry video frame and obtains the geometry image. In addition, the unpacking section 411 unpacks the color video frame and obtains the texture image. Furthermore, the unpacking section 411 unpacks the video frame of the occupancy map and obtains the occupancy map.

The unpacking section 411 supplies the data obtained by such processing, which is, for example, information regarding the geometry image, the texture image, and the occupancy map, to the 3D reconstruction section 217 (arrow 431).

It is noted that the geometry image, the texture image, and the occupancy map supplied to this 3D reconstruction section 217 differ in frame-level resolution or per-patch position and per-patch resolution.

Therefore, the 3D reconstruction section 217 acquires the table information regarding the per-pixel correspondence relations between the occupancy map and the geometry image and between the occupancy map and the texture image contained in the bit stream, and reconstructs 3D data on the basis of the table information. It is thereby possible to correctly reconstruct the 3D data.

In other words, the 3D reconstruction section 217 reconstructs the 3D data from the geometry image contained in the bit stream and obtained by projecting position information regarding the 3D data representing the three-dimensional structure onto a two-dimensional plane, the texture image contained in the bit stream and obtained by projecting attribute information regarding the 3D data onto a two-dimensional plane, and the occupancy map that is map information indicating whether or not data is present at each position on the basis of information indicating the correspondence relation between at least one of the geometry image or the texture image and the occupancy map.

For example, the image processing apparatus includes a reconstruction section that reconstructs the 3D data from the geometry image contained in the bit stream and obtained by projecting the position information regarding the 3D data representing the three-dimensional structure onto the two-dimensional plane, the texture image contained in the bit stream and obtained by projecting the attribute information regarding the 3D data onto the two-dimensional plane, and the occupancy map that is the map information indicating whether or not data is present at each position on the basis of the information indicating the correspondence relation between at least one of the geometry image or the texture image and the occupancy map.

By doing so, it is possible to reconstruct the 3D data by performing unpacking without making adjustment of images (conversion of the positions and the resolutions) of the geometry image and the texture image. It is, therefore, possible to suppress growth of a processing load on the decoding side.

It is noted that the information indicating the correspondence relation between αt least one of the geometry image or the texture image and the occupancy map may contain information indicating a correspondence relation in per-pixel position between the geometry image and the occupancy map and information indicating a correspondence relation in per-pixel position between the texture image and the occupancy map.

<Flow of Encoding Processing>

An example of a flow of encoding processing executed by the encoding apparatus 100 in this case will be described with reference to a flowchart of FIG. 27.

When the encoding processing is started, the patch decomposition section 111 decomposes input 3D data into patches in Step S321, projects the 3D data onto two-dimensional planes per patch, and generates the geometry image, the texture image, and the occupancy map. In Step S322, the auxiliary patch information compression section 113 compresses the auxiliary patch information.

In Step S323, the packing section 112 packs each of the geometry image, the texture image, and the occupancy map obtained in Step S321.

In Step S324, the geometry video encoding section 114 encodes a geometry video frame that is the video frame of the geometry image obtained by packing the geometry image in Step S323 by any encoding method for two-dimensional images, for example, the AVC or the HEVC.

In Step S325, the texture video encoding section 115 encodes a color video frame that is the video frame of the texture image obtained by packing the texture image in Step S323 by any encoding method for two-dimensional images, for example, the AVC or the HEVC.

In Step S326, the OMap encoding section 116 encodes the occupancy map obtained by packing the occupancy map in Step S323 by any encoding method for two-dimensional images, for example, the AVC or the HEVC.

In Step S327, the multiplexer 117 multiplexes various data obtained in Steps S322, S324, S325, and S326 and generates the bit stream containing the various data.

In Step S328, the multiplexer 117 adds information indicating a correspondence relation in pixel between the geometry image and the occupancy map and information indicating a correspondence relation in pixel between the texture image and the occupancy map to the header of the bit stream.

In Step S329, the multiplexer 117 outputs the bit stream generated as described above (that is, bit stream containing the information indicating the correspondence relation in pixel between the geometry image and the occupancy map and the information indicating the correspondence relation in pixel between the texture image and the occupancy map) to outside of the encoding apparatus 100.

When processing in Step S329 is ended, the encoding processing is ended.

<Flow of Packing Processing>

Next, an example of a flow of packing processing executed in Step S323 of FIG. 27 will be described with reference to a flowchart of FIG. 28.

When the packing processing is started, the geometry packing section 121 packs the geometry image in Step S341.

In Step S342, the texture packing section 122 packs the texture image.

In Step S343, the OMap packing section 123 packs the occupancy map.

In Step S344, the geometry packing section 121 generates the information indicating the correspondence relation in pixel between the geometry image and the occupancy map. This information is contained in (signaled to) the bit stream as described above.

In Step S345, the texture packing section 122 generates the information indicating the correspondence relation in pixel between the texture image and the occupancy map. This information is contained in (signaled to) the bit stream as described above.

Figure 27:
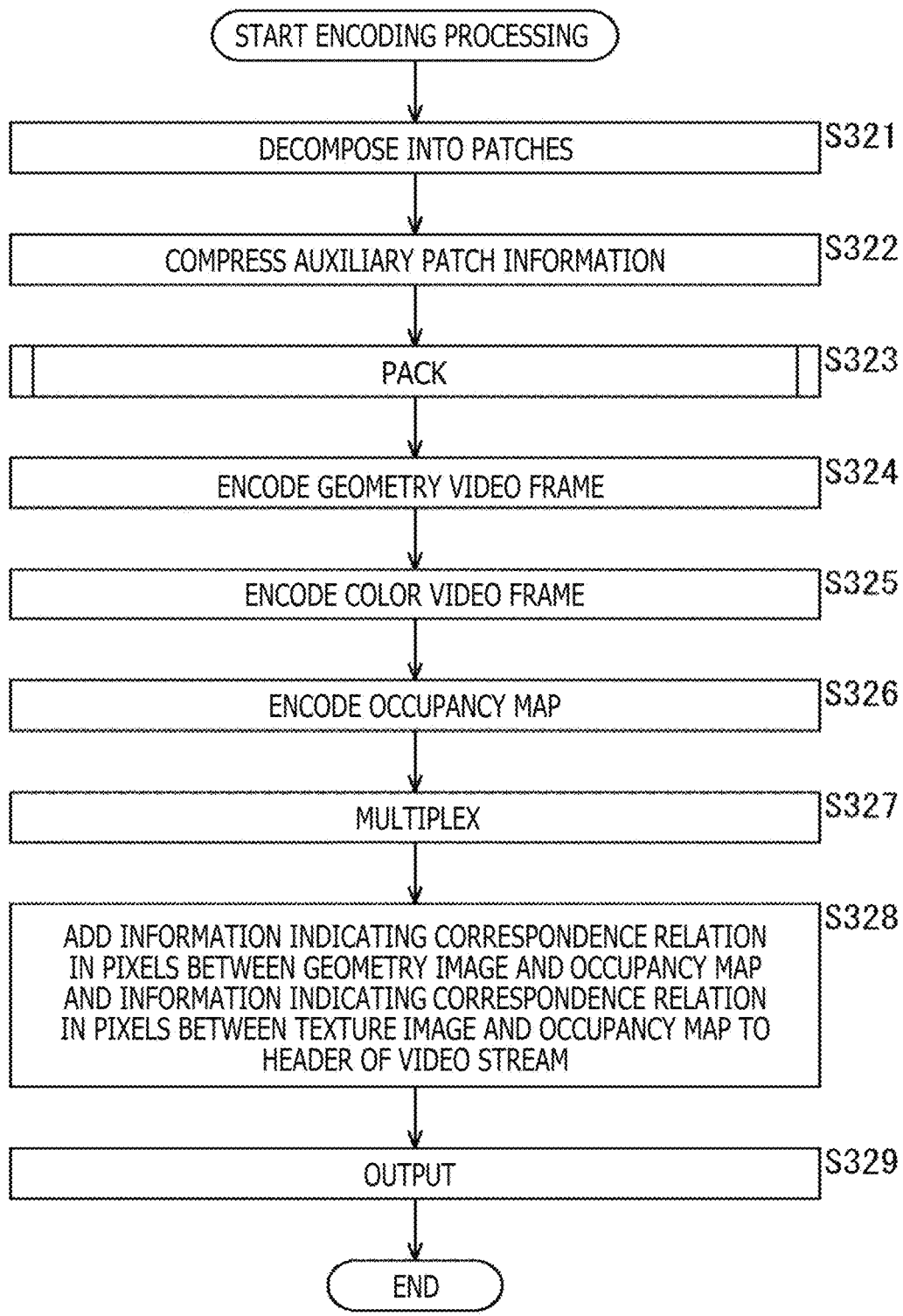
FIG. 27 is a flowchart illustrating an example of a flow of encoding processing.
Figure 28:
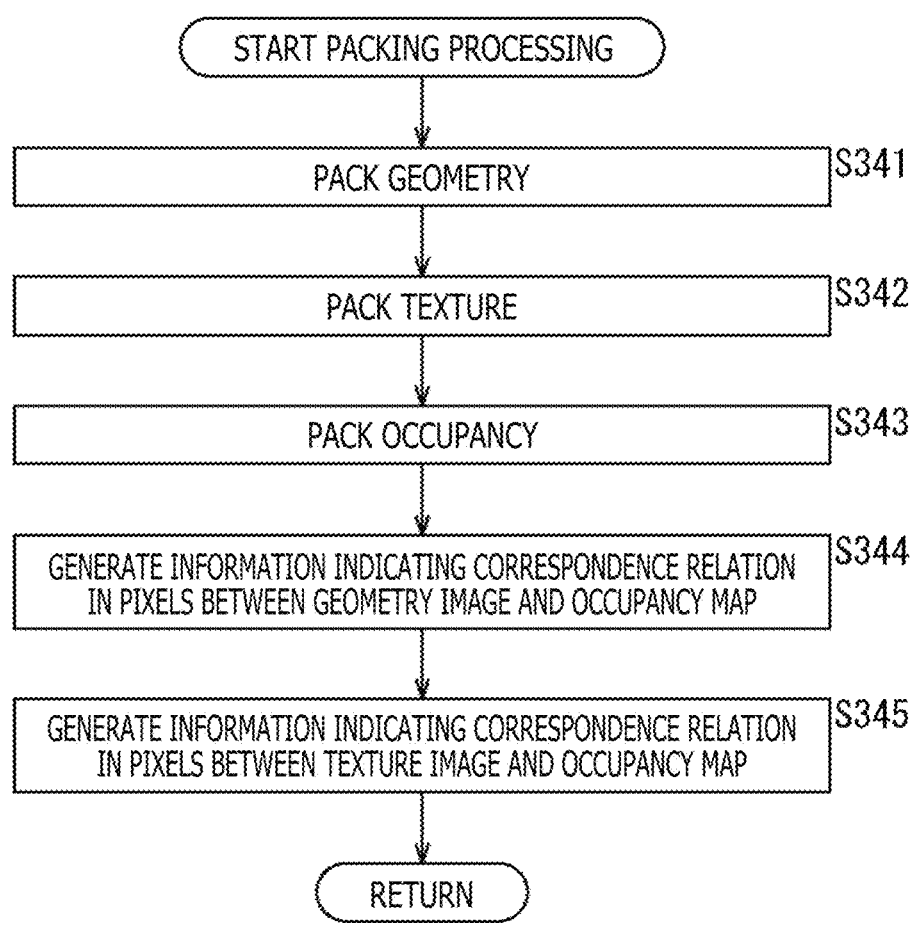
FIG. 28 is a flowchart illustrating an example of a flow of packing processing.

When processing in Step S345 is ended, the packing processing is ended, and the processing returns to FIG. 27.

By executing a series of processing as described above, the encoding apparatus 100 can generate the table information regarding the per-pixel correspondence relation between the occupancy map and the geometry image and the per-pixel correspondence relation between the occupancy map and the texture image, and add the table information to the bit stream (occupancy map, for example).

It is, therefore, possible to suppress growth of a processing load on the decoding side.

<Flow of Decoding Processing>

An example of a flow of decoding processing executed by the decoding apparatus 200 in this case (FIG. 26) will be described with reference to a flowchart of FIG. 29.

When the decoding processing is started, the demultiplexer 211 in the decoding apparatus 200 demultiplexes the input bit stream and extracts the encoded data regarding the auxiliary patch information, the encoded data regarding the video frame of the geometry image, the encoded data regarding the video frame of the texture image, the encoded data regarding the occupancy map, and the like from the bit stream in Step S361.

In Step S362, the auxiliary patch information decoding section 212 decodes the encoded data regarding the auxiliary patch information extracted in Step S361. In Step S363, the geometry video decoding section 213 decodes the encoded data regarding the geometry video frame extracted in Step S361.

In Step S364, the texture video decoding section 214 decodes the encoded data regarding the color video frame extracted in Step S361. In Step S365, the OMap decoding section 215 decodes the encoded data regarding the occupancy map extracted in Step S361.

In Step S366, the unpacking section 411 unpacks each of the geometry video frame obtained in Step S363, the color video frame obtained in Step S364, and the occupancy map obtained in Step S365.

In Step S367, the 3D reconstruction section 217 reconstructs the point cloud on the basis of various information obtained by unpacking each of the geometry video frame, the color video frame, and the occupancy map in Step S366.

When processing in Step S367 is ended, the decoding processing is ended.

<Flow of Point Cloud Reconstruction Processing>

Next, an example of a flow of point cloud reconstruction processing executed in Step S367 of FIG. 29 will be described with reference to a flowchart of FIG. 30.

When the point cloud reconstruction processing is started, the 3D reconstruction section 217 selects a patch to be processed from among unprocessed patches in Step S381.

In Step S382, the 3D reconstruction section 217 selects coordinates of an unprocessed patch on the occupancy map as an object to be processed.

In Step S383, the 3D reconstruction section 217 acquires a pixel value of the geometry image corresponding to the coordinates to be processed on the occupancy map.

In Step S384, the 3D reconstruction section 217 acquires a pixel value of the texture image corresponding to the coordinates to be processed on the occupancy map.

In Step S385, the 3D reconstruction section 217 reconstructs points on the basis of the pixel values obtained in Steps S383 and S384. In other words, the 3D reconstruction section 217 generates position information and attribute information regarding the points in the point cloud.

In Step S386, the 3D reconstruction section 217 determines whether or not all pixels of patches to be processed are completed with processing. In a case in which it is determined that an unprocessed pixel is present (Step S386: NO), the processing returns to Step S382 and a subsequent series of processing is repeated.

In a case in which it is determined in Step S386 that all pixels are completed with processing for the patches to be processed (Step S386: YES), the processing goes to Step S387.

In Step S387, the 3D reconstruction section 217 determines whether or not all patches are completed with processing. In a case in which it is determined that an unprocessed patch is present (Step S387: NO), the processing returns to Step S381 and a subsequent series of processing is repeated. In other words, the patch to be processed is updated to the next patch and similar processing is repeated for the patch.

In a case in which it is determined that all patches are completed with processing in (Step S387: YES), the point cloud reconstruction processing is ended, and the processing returns to FIG. 29.

By executing a series of processing as described above, the decoding apparatus 200 can reconstruct the 3D data by performing unpacking without making adjustment of images (conversion of the positions and the resolutions) of the geometry image and the texture image. It is, therefore, possible to suppress growth of a processing load on the decoding side.

<Flow of Unpacking Reconstruction Processing>

Figure 29:
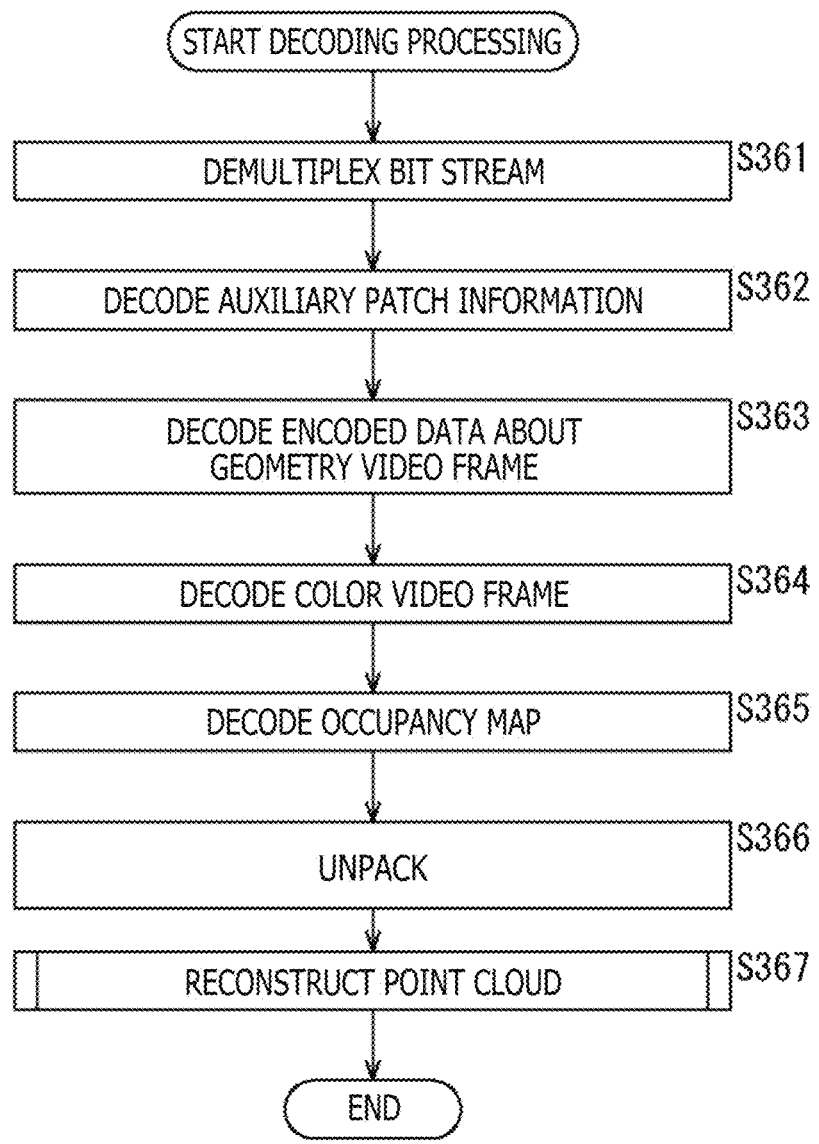
FIG. 29 is a flowchart illustrating an example of a flow of decoding processing.
Figure 30:
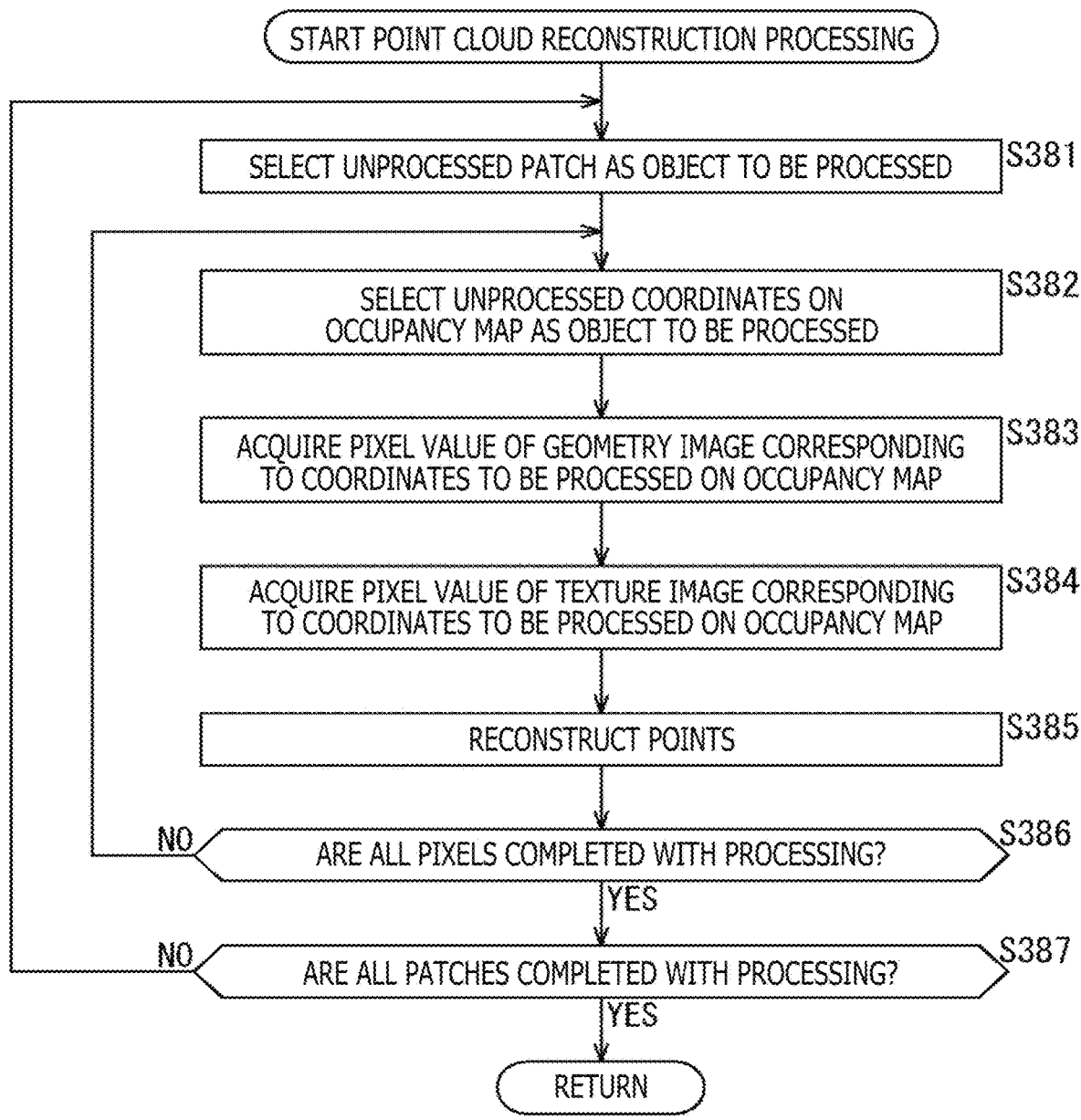
FIG. 30 is a flowchart illustrating an example of a flow of point cloud reconstruction processing.

It is noted that unpacking in Step S366 of FIG. 29 and the point cloud reconstruction in Step S367 of FIG. 29 may be performed in parallel. For example, these types of processing may be performed as one type of processing such as unpacking reconstruction processing.

In other words, the unpacking section 411 may unpack each of the video frame of the geometry image, the video frame of the texture image, and the occupancy map, and the 3D reconstruction section 217 may reconstruct the 3D data in parallel to the unpacking.

This makes it possible to perform the decoding processing more efficiently and suppress growth of the load.

<Flow of Unpacking Reconstruction Processing>

Figure 31:
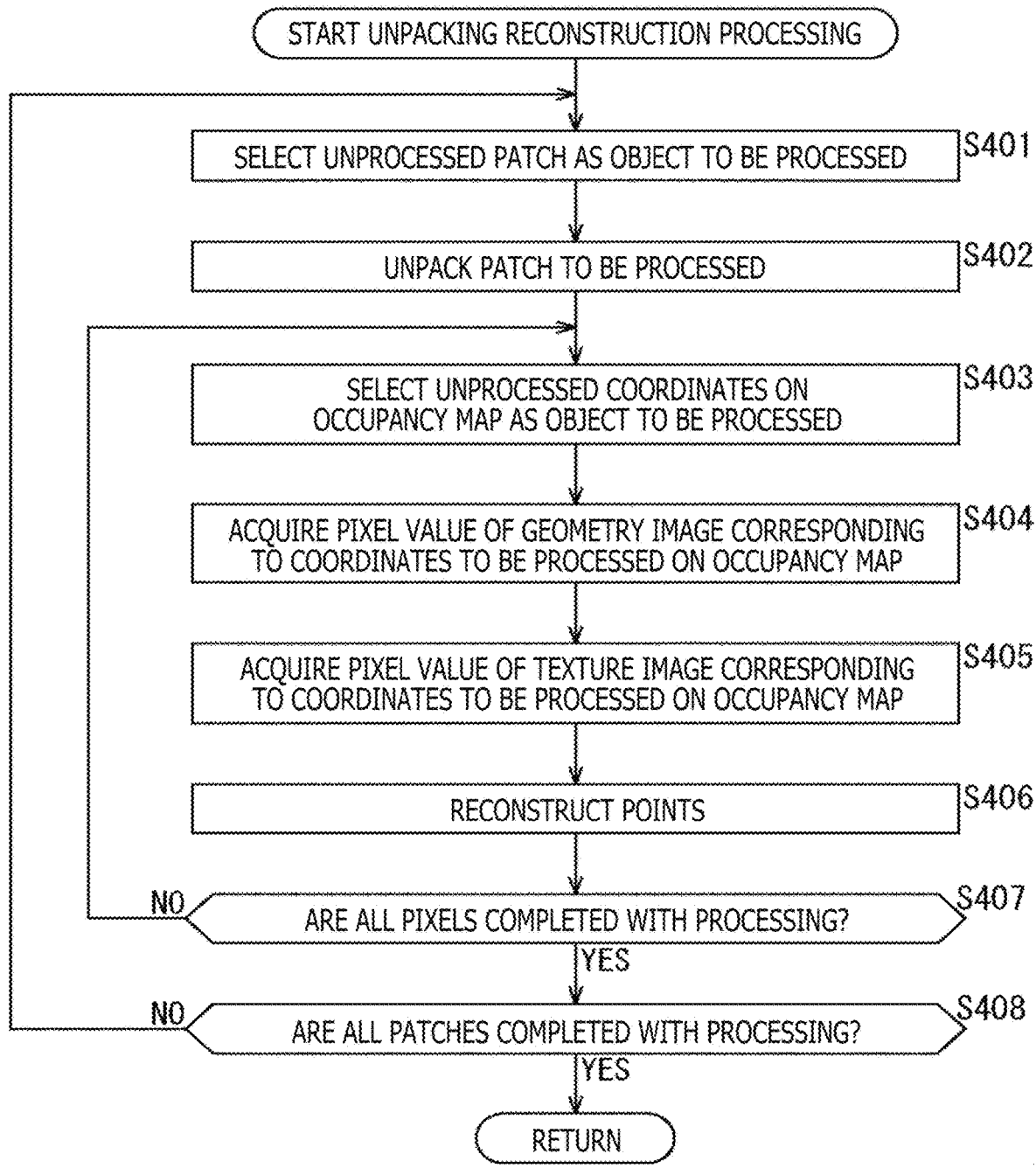
FIG. 31 is a flowchart illustrating an example of a flow of unpacking reconstruction processing.

An example of a flow of the unpacking reconstruction processing executed by the decoding apparatus 200 as an alternative to the series of processing in Steps S366 and S367 will be described with reference to a flowchart of FIG. 31 in the case of performing processing in this way.

When the unpacking reconstruction processing is started, the unpacking section 411 selects a patch to be processed from among unprocessed patches in Step S401.

In Step S402, the unpacking section 411 unpacks the patch to be processed.

In Step S403, the 3D reconstruction section 217 selects coordinates of an unprocessed patch on the occupancy map as an object to be processed.

In Step S404, the 3D reconstruction section 217 acquires a pixel value of the geometry image corresponding to the coordinates to be processed on the occupancy map.

In Step S405, the 3D reconstruction section 217 acquires a pixel value of the texture image corresponding to the coordinates to be processed on the occupancy map.

In Step S406, the 3D reconstruction section 217 reconstructs points on the basis of the pixel values obtained in Steps S404 and S405. In other words, the 3D reconstruction section 217 generates position information and attribute information regarding the points in the point cloud.

In Step S407, the 3D reconstruction section 217 determines whether or not all pixels of patches to be processed are completed with processing. In a case in which it is determined that an unprocessed pixel is present (Step S407: NO), the processing returns to Step S403 and a subsequent series of processing is repeated.

In a case in which it is determined in Step S407 that all pixels are completed with processing for the patches to be processed (Step S407: YES), the processing goes to Step S408.

In Step S408, the unpacking section 411 determines whether or not all patches are completed with processing. In a case in which it is determined that an unprocessed patch is present (Step S408: NO), the processing returns to Step S401 and a subsequent series of processing is repeated. In other words, the patch to be processed is updated to the next patch and similar processing is repeated for the patch.

In a case in which it is determined that all patches are completed with processing in (Step S408: YES), the unpacking reconstruction processing is ended, and the processing returns to FIG. 29.

By executing a series of processing as described above, the decoding apparatus 200 can reconstruct the 3D data by performing unpacking without making adjustment of images (conversion of the positions and the resolutions) of the geometry image and the texture image. In addition, the decoding apparatus 200 can perform the unpacking and the 3D data reconstruction in parallel. It is, therefore, possible to suppress growth of a processing load on the decoding side.

7. Notes

<Control Information>

Control information related to the present technology described in the embodiments so far may be transmitted from an encoding side to a decoding side. For example, control information (for example, enabled flag) for controlling whether or not to permit (or prohibit) application of the present technology described above may be transmitted. Alternatively, for example, control information for designating a range (for example, one of or both an upper limit and a lower limit of a block size, a slice, a picture, a sequence, a component, a view, and a layer) of permitting (or prohibiting) application of the present technology described above may be transmitted.

<Computer>

A series of processing described above can be either executed by hardware or executed by software. In the case of executing a series of processing by the software, a program configuring the software is installed into a computer. Types of the computer include herein a computer incorporated into dedicated hardware, and a computer, for example, a general-purpose personal computer, capable of executing various functions by installing various programs into the computer.

Figure 32:
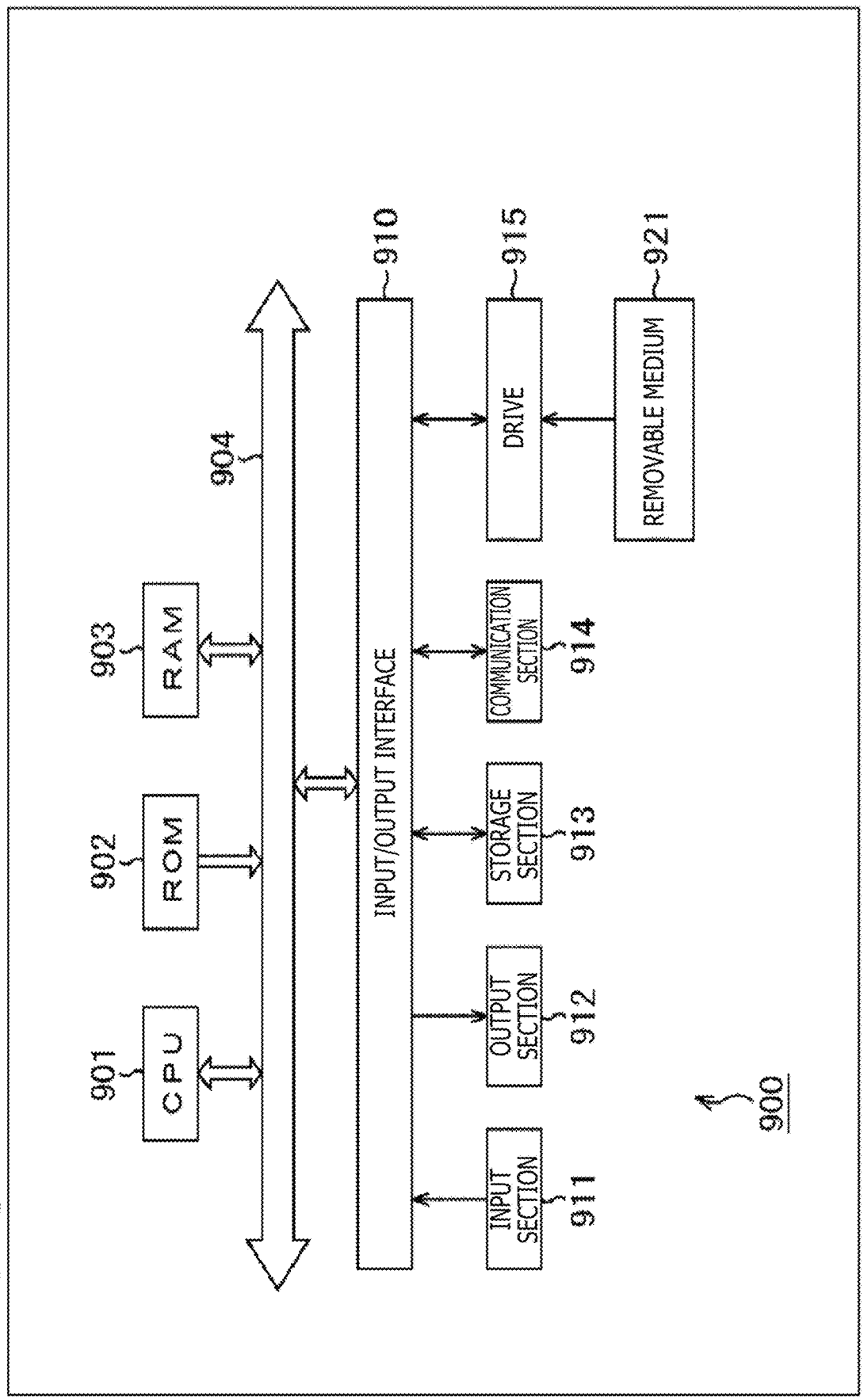
FIG. 32 is a block diagram depicting an example of principal configurations of a computer.

FIG. 32 is a block diagram depicting an example of a configuration of the hardware of the computer executing a series of processes described above by a program.

In a computer 900 depicted in FIG. 32, a CPU (Central Processing Unit) 901, a ROM (Read Only Memory) 902, and a RAM (Random Access Memory) 903 are mutually connected by a bus 904.

An input/output interface 910 is also connected to the bus 904. An input section 911, an output section 912, a storage section 913, a communication section 914, and a drive 915 are connected to the input/output interface 910.

The input section 911 includes, for example, a keyboard, a mouse, a microphone, a touch panel, and an input terminal. The output section 912 includes, for example, a display, a speaker, and an output terminal. The storage section 913 includes, for example, a hard disk, a RAM disk, and a nonvolatile memory. The communication section 914 includes, for example, a network interface. The drive 915 drives a removable medium 921 such as a magnetic disk, an optical disk, a magneto-optical disk or a semiconductor memory.

In the computer configured as described above, the CPU 901 loads a program stored in, for example, the storage section 913 to the RAM 903 via the input/output interface 910 and the bus 904 and executes the program, whereby a series of processing described above is performed. Data and the like necessary for the CPU 901 to execute various processing are also stored in the RAM 903 as appropriate.

The program executed by the computer (CPU 901) can be applied by, for example, recording the program in the removable medium 921 serving as a package medium or the like. In that case, the program can be installed into the storage section 913 via the input/output interface 910 by attaching the removable medium 921 to the drive 915.

Furthermore, this program can be provided via a wired or wireless transmission medium such as a local area network, the Internet, or a digital satellite service. In that case, the program can be received by the communication section 914 and installed into the storage section 913.

In another alternative, this program can be installed into the ROM 902 or the storage section 913 in advance.

<Objects to which Present Technology is Applied>

While a case of applying the present technology to encoding of the point cloud data has been described above, the application of the present technology is not limited to this case and the present technology is applicable to encoding of 3D data under any standards. In other words, without contradiction with the present technology described above, various types of processing in an encoding scheme, a decoding scheme, and the like and various data such as 3D data and metadata may have any specifications. In addition, without contradiction with the present technology, part of processing and specifications described above may be omitted.

Furthermore, the present technology is applicable to any configuration while the encoding apparatus 100 and the decoding apparatus 200 have been described above as examples to which the present technology is applied.

For example, the present technology is applicable to various electronic apparatuses such as a transmitter and a receiver (for example, a television receiver and a cellular telephone) in distribution on satellite broadcasting, wired broadcasting for a cable TV and the like, the Internet and in distribution to a terminal by cellular communication, and apparatuses (for example, a hard disk recorder and a camera) for recording images in a medium such as an optical disk, a magnetic disk, and a flash memory and reproducing images from these storage mediums.

Furthermore, the present technology is carried out as part of configurations of an apparatus such as a processor (for example, a video processor) serving as a system LSI (Large Scale Integration), a module (for example, a video module) using a plurality of processors or the like, a unit (for example, a video unit) using a plurality of modules or the like, a set (for example, a video set) obtained by further adding other functions to the unit.

For example, the present technology is also applicable to a network system including a plurality of apparatuses. For example, the present technology can be carried out as cloud computing for causing a plurality of apparatuses to perform processing via a network in a sharing or cooperative fashion. For example, the present technology may be carried out in a cloud service for providing services associated with images (moving images) to any terminal such as a computer, an AV (Audio Visual) apparatus, a mobile information processing terminal, or an IoT (Internet of Things) device.

It is noted that a system means in the present specification a collection of a plurality of constituent elements (apparatuses, modules (components), and the like), regardless of whether or not all the constituent elements are provided in the same casing. Therefore, a plurality of apparatuses accommodated in different casings and connected to one another via a network and one apparatus in which a plurality of modules is accommodated in one casing can be both referred to as "system."

<Fields to which the Present Technology is Applicable and Use Applications>

Systems, apparatuses, processing sections and the like to which the present technology is applied can be utilized in any field, for example, a field of transportation, medicine, crime prevention, agriculture, livestock, mining, beauty, factories, consumer electronics, weather, and nature monitoring. In addition, use applications of the present technology may be arbitrarily determined.

For example, the present technology is applicable to a system or a device used for providing listening and viewing contents. In addition, the present technology is applicable to, for example, a system or a device used for transportation such as monitoring of a traffic situation and autonomous driving control. Moreover, the present technology is applicable to, for example, a system or a device used for security. Furthermore, the present technology is applicable to, for example, a system or a device used for automatic control over machines and the like. Moreover, the present technology is applicable to, for example, a system or a device used for agriculture and livestock businesses. Further, the present technology is applicable to, for example, a system or a device for monitoring states of nature such as volcanos, forests, and oceans, wildlife, and the like. Moreover, the present technology is applicable to, for example, a system or a device used for sports.

<Others>

It is noted that in the present specification, "flag" is information for distinguishing a plurality of states and includes not only information for use at the time of distinguishing two states of true (1) and false (0) from each other but also include information capable of distinguishing three or more states from one another. Therefore, a value on which this "flag" possibly takes may be binary such as 1 or 2 or may be three or more values. In other words, the number of bits configuring this "flag" is arbitrary and may be one or may be two or more. Furthermore, not only a form of containing identification information (including the flag) in a bit stream but also a form of containing difference information regarding identification information with respect to information that forms a certain basis in a bit stream is supposed; thus, in the present specification, the "flag" or the "identification information" encompasses not only the information but also the difference information with respect to the information that form the basis.

Furthermore, various information (such as metadata) related to encoded data (bit stream) may be transmitted or recorded in any form as long as the various information is associated with the encoded data. A term "associate" means herein, for example, to allow the other data to be used (linked) at the time of processing one data. In other words, data associated with each other may be compiled as one data or individual pieces of data. For example, information associated with the encoded data (image) may be transmitted on a transmission line different from a transmission line used to transmit the encoded data (image). Furthermore, the information associated with the encoded data (image) may be recorded, for example, in a recording medium different from a recording medium in which the encoded data (image) is recorded (or in a different recording area in the same recording medium). It is noted that this "association" may not be association of overall data but may be association of part of data. For example, an image and information corresponding to the image may be associated with each other in any unit such as a plurality of frames, one frame, or a portion in a frame.

It is noted that in the present specification, terms such as "combine," "multiplex," "add," "integrate," "contain/include," "store," "incorporate," "plug," and "insert" mean to compile a plurality of things into one, for example, to compile the encoded data and the metadata into one data, and means one method for "associate" described above.

Moreover, the embodiments of the present technology are not limited to the embodiments described above and various changes can be made without departing from the spirit of the present technology.

For example, a configuration described as one apparatus (or one processing section) may be divided and configured as a plurality of apparatuses (or processing sections). Conversely, configurations described above as a plurality of apparatuses (or processing sections) may be compiled and configured as one apparatus (or one processing section). Moreover, needless to say, a configuration other than that of each apparatus (or each processing section) described above may be added to the configuration of each apparatus (or each processing section). Furthermore, if the configurations or operations are substantially identical as an overall system, part of configurations of a certain apparatus (or certain processing section) may be included in the configurations of the other apparatus (or other processing section).

Furthermore, the program described above can be executed by, for example, any apparatus. In that case, it is sufficient that the apparatus includes necessary functions (functional blocks or the like) to be capable of obtaining necessary information.

Furthermore, each step in one flowchart can be, for example, executed by one apparatus or executed by a plurality of apparatuses in a sharing fashion. Moreover, in a case in which one step includes a plurality of types of processing, the plurality of types of processing may be executed by one apparatus or executed by a plurality of apparatuses in a sharing fashion. In other words, the plurality of types of processing included in the one step can be executed as processing of a plurality of steps. Conversely, processing described as a plurality of steps may be compiled into one step and executed collectively.

Furthermore, the program executed by the computer may be configured, for example, such that a series of processing in steps that describe the program is executed in time series in an order described in the present specification or executed individually either in parallel or at necessary timing such as timing of calling. In other words, the series of processing in the steps may be executed in an order different from the order described above unless contradiction arises. Furthermore, the processing in the steps that describe this program may be executed in parallel to processing of the other program or may be executed in combination with the processing of the other program.

Furthermore, a plurality of present technologies related to the present technology can be carried out independently and solely unless contradiction arises. Needless to say, a plurality of arbitrary present technologies can be carried out in combination. For example, part of or entirety of the present technology described in any of the embodiments may be combined with part of or entirety of the present technology described in another embodiment and the combination can be carried out. Furthermore, part of or entirety of arbitrary present technology described above can be combined with other technologies that are not described above and the combination of the technologies can be carried out.

It is noted that the present technology can be configured as follows.

(1) An image processing apparatus including:
a bit stream generation section that generates a bit stream, the bit stream containing
information indicating a correspondence relation between
at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present αt each position, and
encoded data regarding the geometry image, encoded data regarding the texture image, and encoded data regarding the occupancy map.

(2) The image processing apparatus according to (1), in which
the information indicating the correspondence relation contains information indicating a correspondence relation in resolution between the geometry image and the texture image, and the occupancy map.

(3) The image processing apparatus according to (2), in which
the information indicating the correspondence relation in resolution contains information indicating a correspondence relation in resolution in a horizontal direction and information indicating a correspondence relation in resolution in a vertical direction.

(4) The image processing apparatus according to any one of (1) to (3), in which
the information indicating the correspondence relation contains
information indicating a correspondence relation in resolution between the geometry image and the occupancy map, and
information indicating a correspondence relation in resolution between the texture image and the occupancy map.

(5) The image processing apparatus according to any one of (1) to (4), in which
the information indicating the correspondence relation contains information indicating a correspondence relation in per-patch position and per-patch resolution between the geometry image and the texture image, and the occupancy map.

(6) The image processing apparatus according to (5), in which
the information indicating the correspondence relation in per-patch position and per-patch resolution contains coordinates of opposite vertices of a rectangular area of each patch.

(7) The image processing apparatus according to any one of (1) to (6), in which
the information indicating the correspondence relation contains
information indicating a correspondence relation in per-patch position and per-patch resolution between the geometry image and the occupancy map, and
information indicating a correspondence relation in per-patch position and per-patch resolution between the texture image and the occupancy map.

(8) The image processing apparatus according to any one of (1) to (7), further including:
an encoding section that encodes each of the geometry image, the texture image, and the occupancy map, in which
the bit stream generation section generates a bit stream containing the information indicating the correspondence relation, and encoded data regarding the geometry image, encoded data regarding the texture image, and encoded data regarding the occupancy map that are obtained by encoding the geometry image, the texture image, and the occupancy map by the encoding section.

(9) The image processing apparatus according to (8), further including:
a packing section that packs each of the geometry image, the texture image, and the occupancy map, in which
the encoding section encodes each of a video frame of the geometry image, a video frame of the texture image, and the occupancy map that are packed by the packing section.

(10) The image processing device according to any one of (1) to (9), in which
the 3D data includes a point cloud.

(11) An image processing method including:
generating a bit stream, the bit stream containing
information indicating a correspondence relation between
at least one of a geometry image obtained by projecting position information regarding 3D data representing a three-dimensional structure onto a two-dimensional plane or a texture image obtained by projecting attribute information regarding the 3D data onto a two-dimensional plane, and an occupancy map that is map information indicating whether or not data is present αt each position, and encoded data regarding the geometry image, encoded data regarding the texture image, and encoded data regarding the occupancy map.

(21) An image processing apparatus including:

an unpacking section that unpacks each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

(22) The image processing apparatus according to (21), in which the information indicating the correspondence relation contains information indicating a correspondence relation in resolution between the geometry image and the texture image, and the occupancy map, and the unpacking section changes a resolution of each of the geometry image and the texture image to be identical to a resolution of the occupancy map on the basis of the information indicating the correspondence relation in resolution, and unpacks each of the video frame of the resolution-changed geometry image, the video frame of the resolution-changed texture image, and the occupancy map.

(23) The image processing apparatus according to (21) or (22), in which the information indicating the correspondence relation contains information indicating a correspondence relation in resolution between the geometry image and the occupancy map, and information indicating a correspondence relation in resolution between the texture image and the occupancy map, and the unpacking section changes a resolution of the geometry image to be identical to a resolution of the occupancy map on the basis of the information indicating the correspondence relation in resolution between the geometry image and the occupancy map, changes a resolution of the texture image to be identical to the resolution of the occupancy map on the basis of the information indicating the correspondence relation in resolution between the texture image and the occupancy map, and unpacks each of the video frame of the resolution-changed geometry image, the video frame of the resolution-changed texture image, and the occupancy map.

(24) The image processing apparatus according to any one of (21) to (23), in which the information indicating the correspondence relation contains information indicating a correspondence relation in per-patch position and per-patch resolution between the geometry image and the texture image, and the occupancy map, and the unpacking section changes a per-patch position and a per-patch resolution of each of the geometry image and the texture image to be identical to a per-patch position and a per-patch resolution of the occupancy map on the basis of the information indicating the correspondence relation in per-patch position and per-patch resolution, and unpacks each of the video frame of the geometry image after changing the per-patch position and the per-patch resolution, the video frame of the texture image after changing the per-patch position and the per-patch resolution, and the occupancy map.

(25) The image processing apparatus according to any one of (21) to (24), in which the information indicating the correspondence relation contains information indicating a correspondence relation in per-patch position and per-patch resolution between the geometry image and the occupancy map, and information indicating a correspondence relation in per-patch position and per-patch resolution between the texture image and the occupancy map, and the unpacking section changes a per-patch position and a per-patch resolution of the geometry image to be identical to a per-patch position and a per-patch resolution of the occupancy map on the basis of the information indicating the correspondence relation in per-patch position and per-patch resolution between the geometry image and the occupancy map, changes a per-patch position and a per-patch resolution of the texture image to be identical to the per-patch position and the per-patch resolution of the occupancy map on the basis of the information indicating the correspondence relation in per-patch position and per-patch resolution between the texture image and the occupancy map, and unpacks each of the video frame of the geometry image after changing the per-patch position and the per-patch resolution, the video frame of the texture image after changing the per-patch position and the per-patch resolution, and the occupancy map.

(26) The image processing apparatus according to any one of (21) to (25), further including:

a decoding section that decodes each of encoded data regarding the video frame of the geometry image, encoded data regarding the video frame of the texture image, and encoded data regarding the occupancy map, in which the unpacking section unpacks each of the video frame of the geometry image, the video frame of the texture image, and the occupancy map that are obtained by decoding each of the encoded data regarding the video frame of the geometry image, the encoded data regarding the video frame of the texture image, and the encoded data regarding the occupancy map by the decoding section.

(27) The image processing apparatus according to (26), further including:

an extraction section that extracts the encoded data regarding the video frame of the geometry image, the encoded data regarding the video frame of the texture image, and the encoded data regarding the occupancy map from the bit stream, in which the decoding section decodes each of the encoded data regarding the video frame of the geometry image, the encoded data regarding the video frame of the texture image, and the encoded data regarding the occupancy map that are extracted from the bit stream by the extraction section.

(28) The image processing apparatus according to any one of (21) to (27), in which the 3D data includes a point cloud.

(29) An image processing method including:

unpacking each of a video frame of a geometry image contained in a bit stream and obtained by projecting position information regarding 3D data representing a three-dimensional structure onto a two-dimensional plane, a video frame of a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

(31) An image processing apparatus including:

a reconstruction section that reconstructs 3D data representing a three-dimensional structure from a geometry image contained in a bit stream and obtained by projecting position information regarding the 3D data onto a two-dimensional plane, a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

(32) The image processing apparatus according to (31), in which the information indicating the correspondence relation contains information indicating a correspondence relation in per-pixel position between the geometry image and the occupancy map, and information indicating a correspondence relation in per-pixel position between the texture image and the occupancy map.

(33) The image processing apparatus according to (31) or (32), further including:

an unpacking section that unpacks each of a video frame of the geometry image, a video frame of the texture image, and the occupancy map, in which the reconstruction section reconstructs the 3D data in parallel to unpacking of each of the video frame of the geometry image, the video frame of the texture image, and the occupancy map by the unpacking section.

(34) The image processing apparatus according to any one of (31) to (33), in which the 3D data includes a point cloud.

(35) An image processing method including:

reconstructing 3D data representing a three-dimensional structure from a geometry image contained in a bit stream and obtained by projecting position information regarding the 3D data onto a two-dimensional plane, a texture image contained in the bit stream and obtained by projecting attribute information regarding the 3D data onto a two-dimensional plane, and an occupancy map that is map information indicating whether or not data is present at each position on the basis of information indicating a correspondence relation between at least one of the geometry image or the texture image and the occupancy map.

REFERENCE SIGNS LIST

100: Encoding apparatus
111: Patch decomposition section
112: Packing section
113: Auxiliary patch information compression section
114: Geometry video encoding section
115: Texture video encoding section
116: OMap encoding section
117: Multiplexer
121: Geometry packing section
122: Texture packing section
123: OMap packing section
124: Multiplexer
200: Decoding apparatus
211: Demultiplexer
212: Auxiliary patch information decoding section
213: Geometry video decoding section
214: Texture video decoding section
215: OMap decoding section
216: Unpacking section
217: 3D reconstruction section
221: Demultiplexer
222: Geometry image processing section
223: Texture image processing section
224: Unpacking section
411: Unpacking section

The invention claimed is:

1. An image encoding apparatus, comprising:
circuitry configured to:
obtain a geometry image, a texture image, and an occupancy map by projecting patch images of 3D data representing a three-dimensional structure onto respective two-dimensional planes, wherein
the occupancy map is map information indicating that data is present at each position, and
at least one of the geometry image or the texture image has a resolution different from a resolution of the occupancy map;
encode the geometry image, the texture image, and the occupancy map; and
generate a bit stream comprising the encoded geometry image, the encoded texture image, the encoded occupancy map, a first variable indicating a first relation between the resolution of the occupancy map and the resolution of the geometry image, and a second variable indicating a second relation between the resolution of the occupancy map and the resolution of the texture image, wherein
the first variable and the second variable indicate correspondence information between a range of each of the patch images of the occupancy map and a range of each of the patch images of at least one of the geometry image or the texture image.

2. The image encoding apparatus according to claim 1, wherein each of the first variable and the second variable is defined in a horizontal direction and a vertical direction.

3. An image encoding method, comprising:
obtaining a geometry image, a texture image, and an occupancy map by projecting patch images of 3D data representing a three-dimensional structure onto respective two-dimensional planes, wherein
the occupancy map is map information indicating that data is present at each position, and
at least one of the geometry image or the texture image has a resolution different from a resolution of the occupancy map;
encoding the geometry image, the texture image, and the occupancy map; and
generating a bit stream comprising the encoded geometry image, the encoded texture image, the encoded occupancy map, a first variable indicating a first relation between the resolution of the occupancy map and the resolution of the geometry image, and a second variable indicating a second relation between the resolution of the occupancy map and the resolution of the texture image, wherein the first variable and the second variable indicate correspondence information between a range of each of the patch images of the occupancy map and a range of each of the patch images of at least one of the geometry image or the texture image.

4. An image decoding apparatus, comprising:

circuitry configured to:

obtain, from a bit stream, an encoded geometry image, an encoded texture image, an encoded occupancy map, a first variable, and a second variable, wherein the encoded occupancy map is map information indicating whether data is present at each position, the first variable indicates a first relation between a resolution of the encoded occupancy map and a resolution of the encoded geometry image, and the second variable indicates a second relation between the resolution of the encoded occupancy map and a resolution of the encoded texture image;

decode the encoded geometry image, the encoded texture image, and the encoded occupancy map;

change, based on the first variable and the second variable, the resolution of the decoded geometry image and the resolution of the decoded texture image to be identical to the resolution of the decoded occupancy map;

unpack, the decoded geometry image and the decoded texture image having the resolution identical to that of the decoded occupancy map; and reconstruct 3D data based on the unpacked geometry image, the unpacked texture image, and the decoded occupancy map, wherein the 3D data represents a three-dimensional structure, wherein the first variable and the second variable indicate correspondence information between a range of each of patch images of the encoded occupancy map and a range of each of patch images of at least one of the encoded geometry image or the encoded texture image.

5. The image decoding apparatus according to claim 4, wherein each of the first variable and the second variable is defined in a horizontal direction and a vertical direction.

6. The image decoding apparatus according to claim 4, wherein the 3D data includes a point cloud.

7. An image decoding method, comprising:

obtaining, from a bit stream, an encoded geometry image, an encoded texture image, an encoded occupancy map, a first variable, and a second variable, wherein the encoded occupancy map is map information indicating whether data is present at each position, the first variable indicates a first relation between a resolution of the encoded occupancy map and a resolution of the encoded geometry image, and the second variable indicates a second relation between the resolution of the encoded occupancy map and a resolution of the encoded texture image;

decoding the encoded geometry image, the encoded texture image, and the encoded occupancy map;

changing, based on the first variable and the second variable, the resolution of the decoded geometry image and the resolution of the decoded texture image to be identical to the resolution of the decoded occupancy map;

unpacking, the decoded geometry image and the decoded texture image having the resolution identical to that of the decoded occupancy map; and reconstructing 3D data based on the unpacked geometry image, the unpacked texture image, and the decoded occupancy map, wherein the 3D data represents a three-dimensional structure, wherein the first variable and the second variable indicate correspondence information between a range of each of patch images of the encoded occupancy map and a range of each of patch images of at least one of the encoded geometry image or the encoded texture image.

* * * * *